(12) United States Patent
Unagami et al.

(10) Patent No.: US 11,861,951 B2
(45) Date of Patent: *Jan. 2, 2024

(54) DRIVING MANAGEMENT SYSTEM, VEHICLE, AND INFORMATION PROCESSING METHOD

(71) Applicant: PANASONIC INTELLECTUAL PROPERTY CORPORATION OF AMERICA, Torrance, CA (US)

(72) Inventors: Yuji Unagami, Osaka (JP); Junichiro Soeda, Nara (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/386,209

(22) Filed: Jul. 27, 2021

(65) Prior Publication Data

US 2022/0012958 A1 Jan. 13, 2022

Related U.S. Application Data

(63) Continuation of application No. 16/047,022, filed on Jul. 27, 2018, now Pat. No. 11,107,300.

(30) Foreign Application Priority Data

Apr. 25, 2018 (JP) ................................. 2018-084204

(51) Int. Cl.
  *G07C 5/00* (2006.01)
  *G07C 5/02* (2006.01)
  (Continued)

(52) U.S. Cl.
  CPC ......... *G07C 5/008* (2013.01); *B60W 50/0098* (2013.01); *B60W 50/082* (2013.01);
  (Continued)

(58) Field of Classification Search
  CPC ........... B60W 50/0098; B60W 50/082; B60W 50/14; B60W 2050/0096; B60W 2540/00;
  (Continued)

(56) References Cited

U.S. PATENT DOCUMENTS 9,147,219 B2  9/2015 Binion
9,715,711 B1  7/2017 Konrardy
(Continued)

FOREIGN PATENT DOCUMENTS

CN    104350502 A    2/2015
CN    108297877 A  * 7/2018 ........ B60W 50/0097
(Continued)

OTHER PUBLICATIONS

English Translation of Chinese Search Report dated Sep. 16, 2022 for Chinese Patent Application No. 1 201810926423.4.
(Continued)

*Primary Examiner* — Joshua E Rodden
(74) *Attorney, Agent, or Firm* — GREENBLUM & BERNSTEIN, P.L.C.

(57) ABSTRACT

A vehicle in a driving management system including one or more authentication servers and one or more vehicles capable of switching between a manual driving mode and an automatic driving mode is provided. The vehicle includes a communication unit that communicate with at least one authentication server of the one or more authentication servers, and a detecting unit that detects switching between the manual driving mode where manual driving is performed, and an automatic driving mode where automatic driving is performed, based on a message issued by at least
(Continued)

one of the plurality of electronic control processors. The vehicle also includes a generating unit that generates transaction data including information indicating the detected switching, and an identifier indicating the vehicle, and transmits, to the at least one authentication server, the transaction data.

9 Claims, 20 Drawing Sheets

Related U.S. Application Data

(60) Provisional application No. 62/549,156, filed on Aug. 23, 2017.

(51) Int. Cl.
*B60W 50/00* (2006.01)
*B60W 50/08* (2020.01)
*B60W 50/14* (2020.01)
*G05D 1/00* (2006.01)
*H04L 9/40* (2022.01)

(52) U.S. Cl.
CPC .............. *B60W 50/14* (2013.01); *G07C 5/02* (2013.01); *H04L 63/123* (2013.01); *B60W 2050/0096* (2013.01); *B60W 2540/00* (2013.01); *G05D 1/0061* (2013.01)

(58) Field of Classification Search
CPC ........ G05D 1/0061; G07C 5/008; G07C 5/02; H04L 63/123
See application file for complete search history.

(56) References Cited

U.S. PATENT DOCUMENTS

| | | | |
|---|---|---|---|
| 10,198,772 B2 | 2/2019 | Parameshwaran | |
| 10,713,727 B1 | 7/2020 | Floyd | |
| 2003/0016636 A1 | 1/2003 | Tari et al. | |
| 2013/0304514 A1 | 11/2013 | Hyde | |
| 2014/0358353 A1 | 12/2014 | Ibanez-Guzman | |
| 2015/0195266 A1 | 7/2015 | Endo et al. | |
| 2015/0330802 A1 | 11/2015 | Ono | |
| 2016/0203560 A1* | 7/2016 | Parameshwaran | G06Q 40/08 705/4 |
| 2017/0046652 A1 | 2/2017 | Haldenby et al. | |
| 2017/0232300 A1 | 8/2017 | Tran et al. | |
| 2017/0294120 A1 | 10/2017 | Ootsuji | |
| 2018/0339712 A1 | 11/2018 | Kislovskiy | |
| 2019/0064804 A1 | 2/2019 | Frazzoli | |
| 2019/0066402 A1 | 2/2019 | Unagami | |
| 2019/0268417 A1 | 8/2019 | McClelland | |
| 2020/0159251 A1 | 5/2020 | Iwasaki | |

FOREIGN PATENT DOCUMENTS

| | | |
|---|---|---|
| JP | 2003-101565 A | 4/2003 |
| JP | 2004-171482 A | 6/2004 |
| JP | 2013-193598 A | 9/2013 |
| JP | 2013-250640 A | 12/2013 |
| JP | 2015-219128 A | 12/2015 |
| JP | 2016-503740 A | 2/2016 |
| JP | 2017-061320 | 3/2017 |
| WO | 2013/123057 A1 | 8/2013 |
| WO | 2016/080070 A1 | 5/2016 |

OTHER PUBLICATIONS

The Extended European Search Report dated Jan. 17, 2019 for the related European Patent Application No. 18188200.2.
Communication pursuant to Article 94(3) EPC dated Aug. 27, 2020 for European Patent Application No. 18188200.2.
Tsuyoshi Moroioka, "Automobiles, block chain and payments", Infcurion Insight, Japan, Infcurion Inc., Jan. 15, 2016, https://insight.infcurion.com/fintech/auto-blockchain-and-payment/.
Kazue Sako, "Approaching the Operation Principles of Block Chain as a History Accumulation System (Partial English Translation)", Nikkei XTECH, Japan, Nikkei BP Inc., Aug. 22, 2016, https://xtech.nikkei.com/it/atcl/column/16/062400138/081200005/.

* cited by examiner

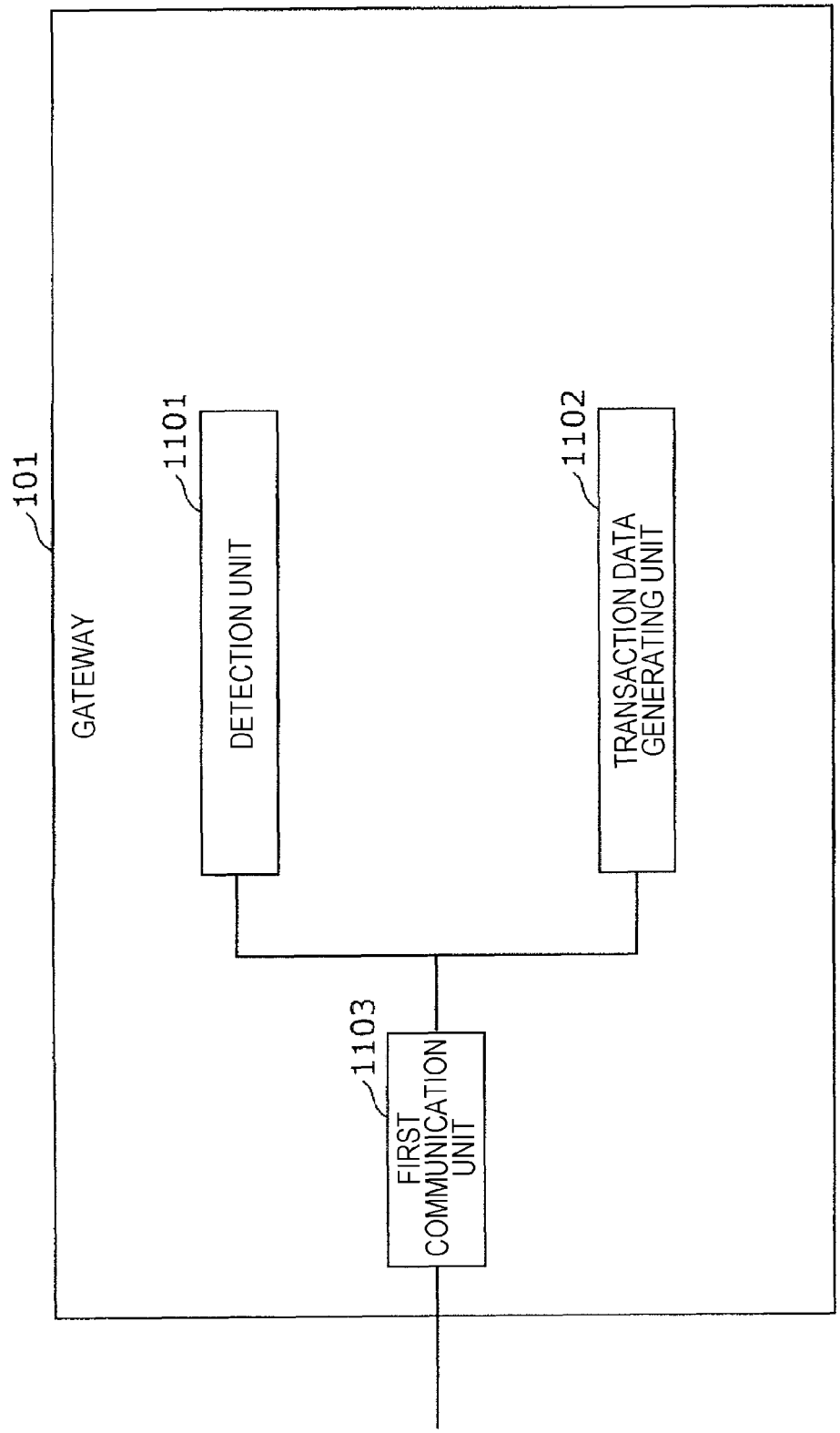

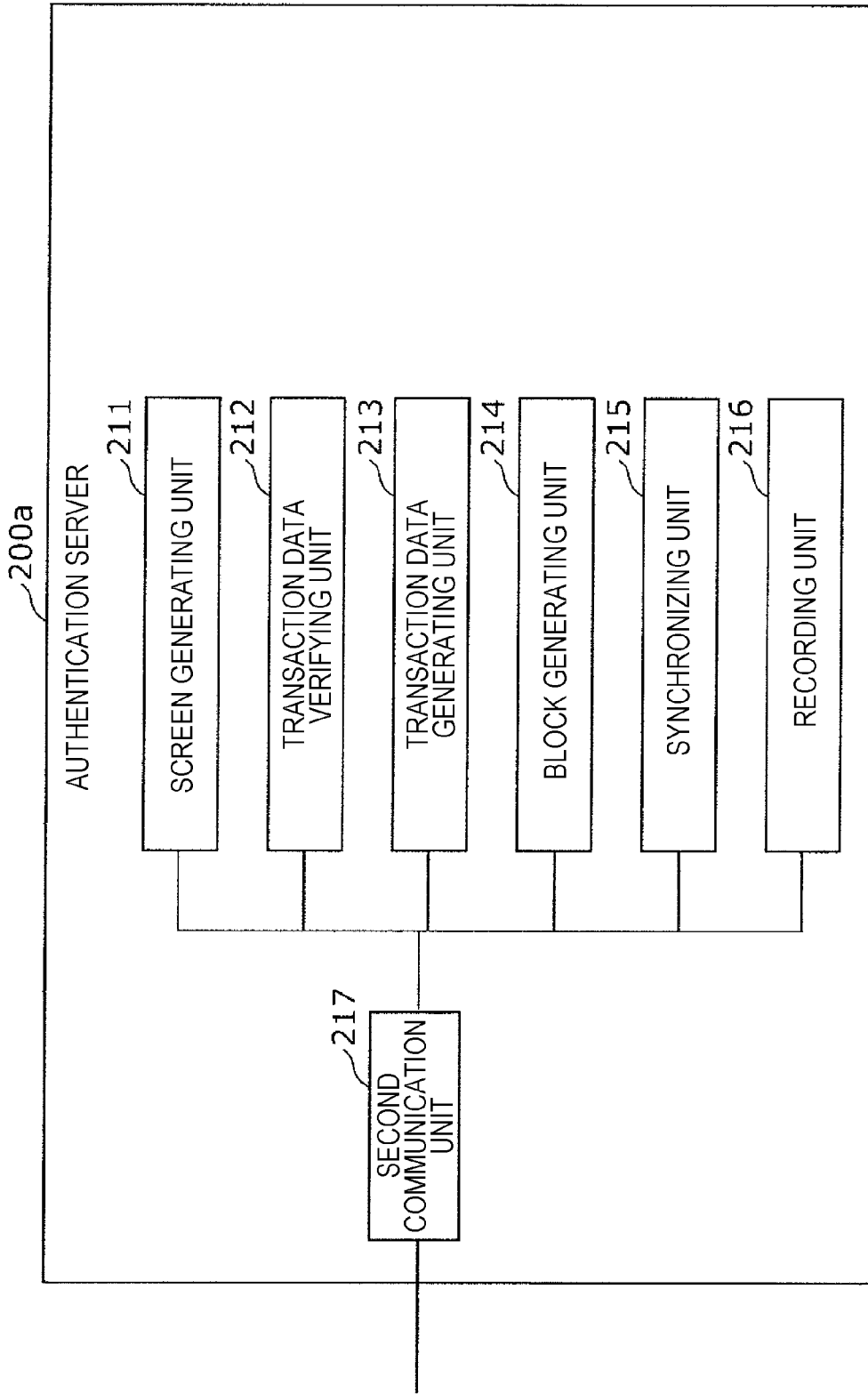

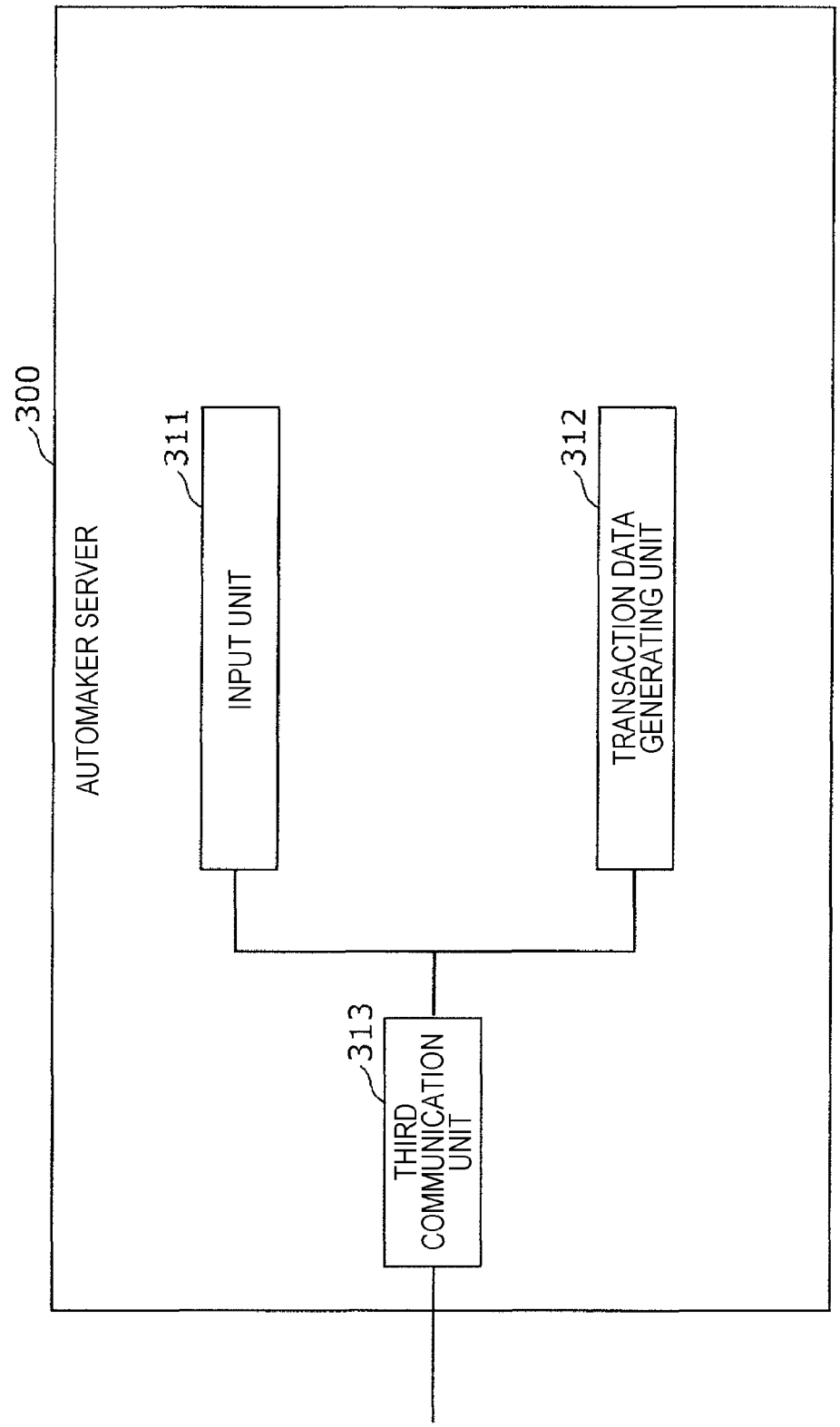

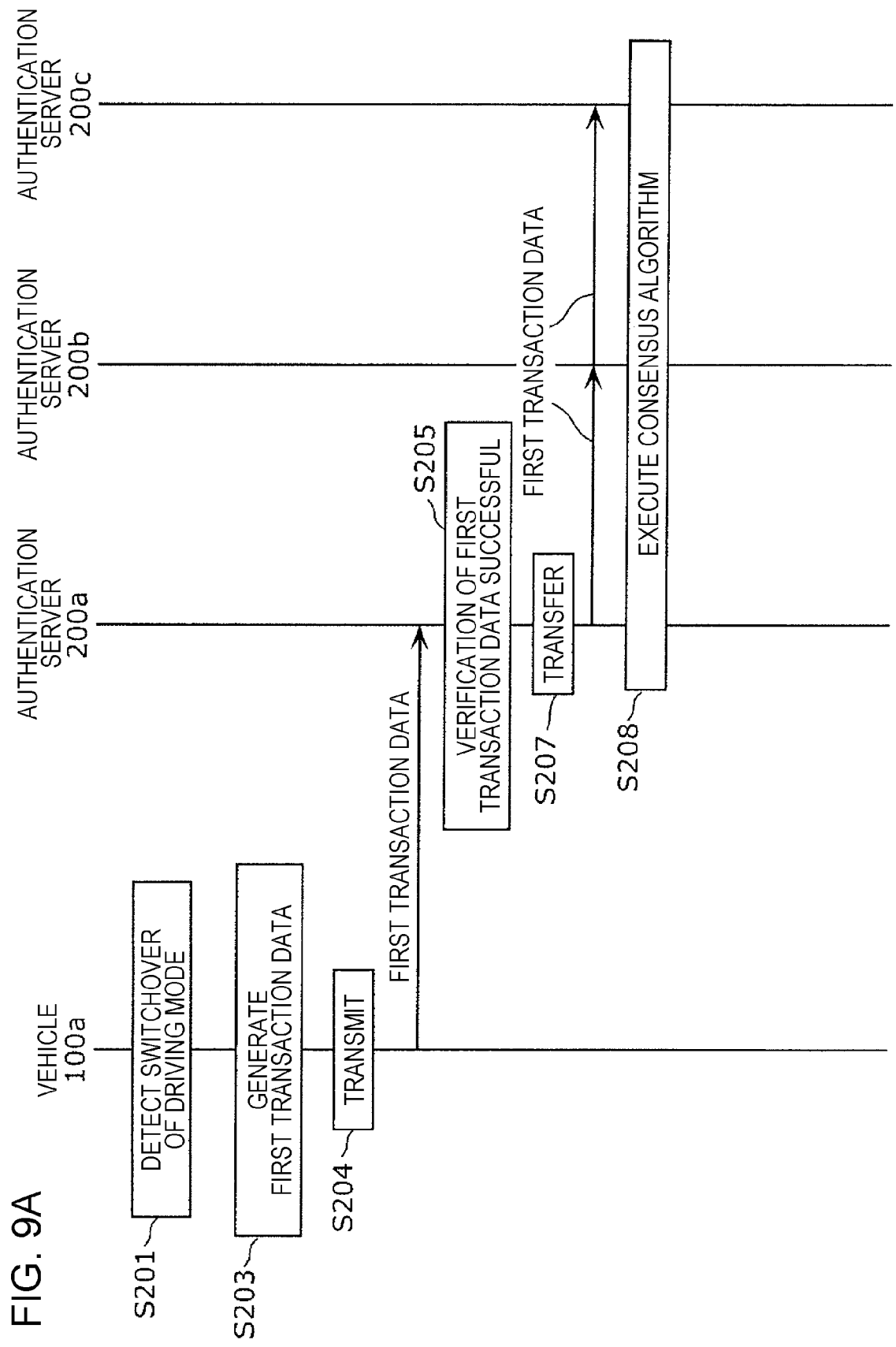

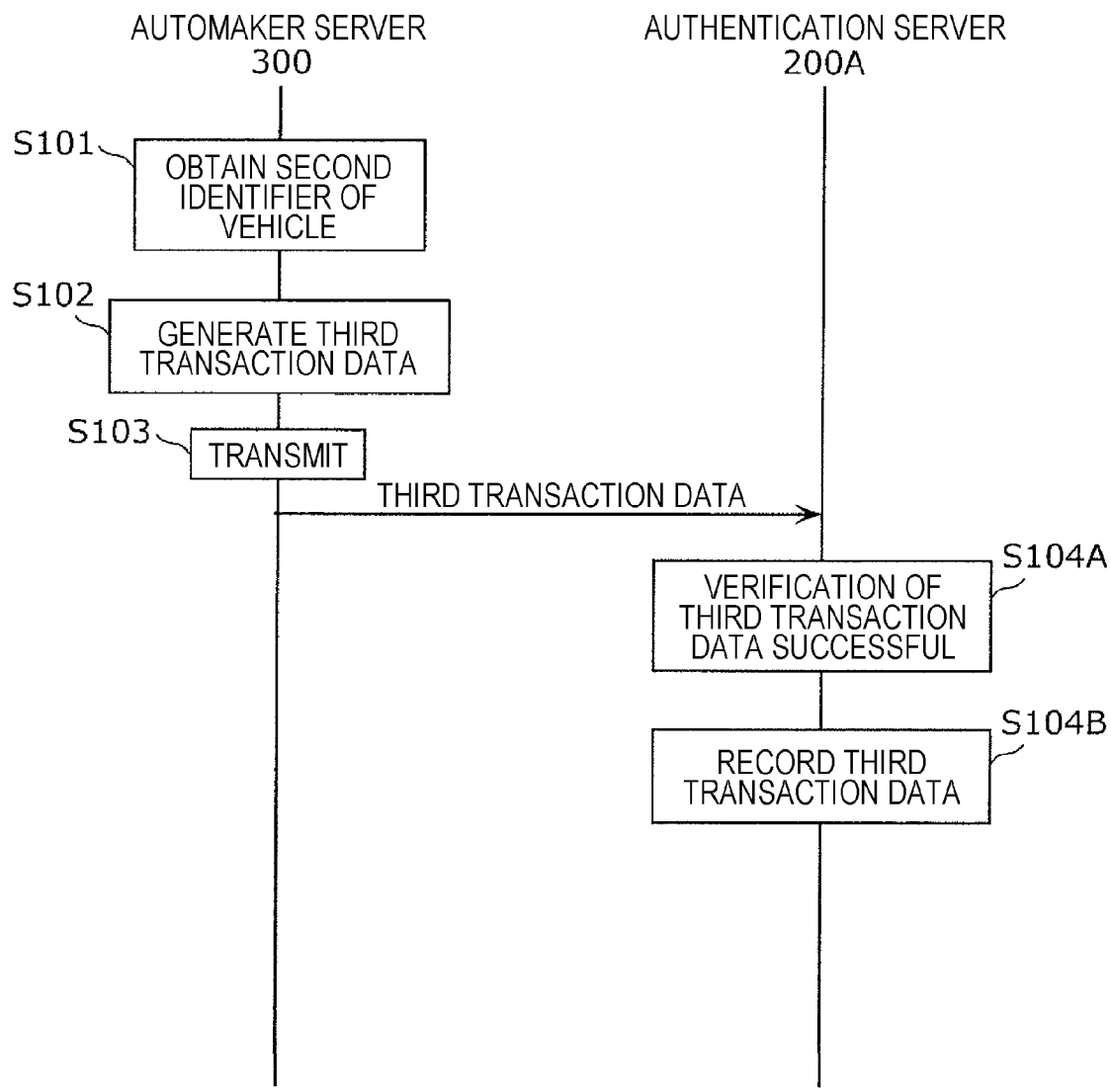

FIG. 17

| FIRST IDENTIFIER | TRANSACTION | DRIVING MODE | APPROVED BY USER? |
|---|---|---|---|
| 100a | DRIVING MODE SWITCHOVER | MANUAL DRIVING MODE | — |
| 100b | DRIVING MODE SWITCHOVER | AUTOMATIC DRIVING MODE | YES |
| ... | ... | ... | ... |

DRIVING MANAGEMENT SYSTEM, VEHICLE, AND INFORMATION PROCESSING METHOD

CROSS-REFERENCE TO RELATED APPLICATIONS

This application is a Continuation of U.S. patent application Ser. No. 16/047,022, filed on Jul. 27, 2018, which claims the benefit of U.S. Provisional Pat. Appl. No. 62/549,156, filed Aug. 23, 2017, and priority to Jap. Pat. Appl. No. 2018-084204, filed Apr. 25, 2018. The disclosure of each of these documents, including the specification, drawings, and claims, is incorporated herein by reference in its entirety.

BACKGROUND

1. Technical Field

The present disclosure relates to a driving management system, a vehicle, and an information processing method.

2. Description of the Related Art

As of recent, research and development of automatic driving systems, where traveling control of an automobile is automatically performed, is being actively carried out. Electronic control units (hereinafter, "ECUs" also referred to as electronic control processors) installed in the automobile cooperate in an automatic driving system to perform traveling control. Also, automatic driving systems guarantee safe traveling by switching between a manual driving mode, where the driver is driving, i.e., where the driver performs traveling control of the automobile, and an automatic driving mode, where the automobile is autonomously traveling, i.e., where the automobile automatically performs traveling control. For example, Japanese Unexamined Patent Application Publication No. 2017-61320 discloses a technology that switches from the manual driving mode to the automatic driving mode, by judging whether switching conditions decided beforehand are met based on traffic rules.

SUMMARY

Now, if a traffic accident occurs while in the automatic driving mode, the driver is not responsible, and there is a problem with the automobile itself. However, in a case where this automobile accident occurs, in the technology disclosed in Japanese Unexamined Patent Application Publication No. 2017-61320, whether the accident happened while in the automatic driving mode or whether the accident happened while in the manual driving mode cannot be objectively judged. Accordingly, whether there is a problem with the automatic driving functions that realize the automatic driving system cannot be verified, and the automatic driving functions cannot be improved. This leads to a problem that a safer automatic driving system cannot be constructed.

One non-limiting and exemplary embodiment provides a driving management system and so forth where switching of driving modes of a vehicle can be managed in a sure manner.

In one general aspect, the techniques disclosed here feature a driving management system including one or more authentication servers, and one or more vehicles capable of switching between a manual driving mode and an automatic driving mode. Each of the one or more vehicles includes a plurality of electronic control processors connected to a network inside the vehicle, and a first processor. The first processor comprises a memory which includes instructions that, when executed by the first processor, causes the first processor to perform operations including: communicating with at least one authentication server of the one or more authentication servers, detecting switching between the manual driving mode where manual driving is performed, and the automatic driving mode where automatic driving is performed, based on an output of the one or more electronic control processors of the plurality of electronic control processors, and generating first transaction data including information indicating the detected switching, and a first identifier indicating the vehicle, and transmitting the first transaction data to the one authentication server. Each of the at least one authentication servers includes a second processor comprising a memory which includes instruction that, when executed by the second processor, causes the second processor to perform operations including: communicating with each of the one or more vehicles, verifying validity of transaction data including the first transaction data obtained from at least one vehicle of the one or more vehicles, and recording the transaction data, of which the validity has been verified, in a storage device.

According to the present disclosure, switching of driving modes of a vehicle can be managed in a sure manner.

It should be noted that general or specific embodiments may be implemented as a system, a method, an integrated circuit, a computer program, or a computer-readable recording medium such as a CD-ROM or the like, or any selective combination of system, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a block diagram illustrating the functional configuration of a gateway according to the embodiment;

FIG. 5 is a block diagram illustrating the functional configuration of an authentication server according to the embodiment;

FIG. 7 is a block diagram illustrating the functional configuration of an automaker server according to the embodiment;

FIG. 9A is a sequence diagram illustrating first verification processing between the vehicle and authentication server in the embodiment;

FIG. 14 is a sequence diagram illustrating registration processing between the automaker server and authentication server in the modification of the embodiment;

FIG. 15 illustrates an example of a data structure used when the authentication server records third transaction data in the modification of the embodiment;

FIG. 17 illustrates an example of a data structure used when the authentication server records first transaction data in the modification of the embodiment.

DETAILED DESCRIPTION

Figure 1:
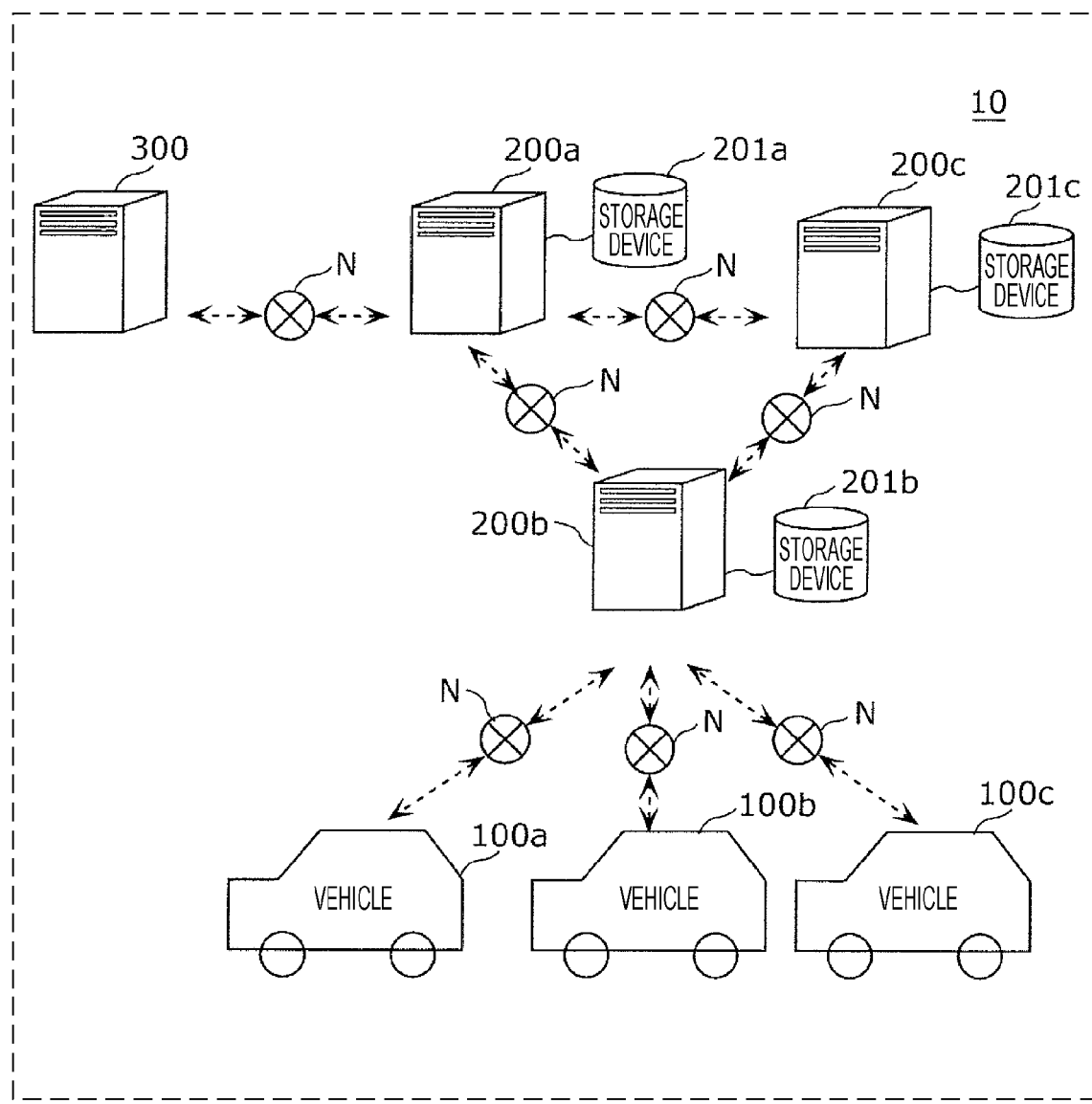
FIG. 1 is a diagram illustrating an example of the configuration of a driving management system according to an embodiment.

A driving management system according to an aspect of the present disclosure is a management system that includes one or more authentication servers, and one or more vehicles capable of switching between a manual driving mode and an automatic driving mode. Each of the one or more vehicles includes a plurality of electronic control processors connected to a network inside the vehicle, and a first processor. The first processor comprises a memory which includes instructions that, when executed by the first processor, causes the first processor to perform operations including: communicating with at least one authentication server of the one or more authentication servers, detecting switching between the manual driving mode where manual driving is performed, and the automatic driving mode where automatic driving is performed, based on an output of the one or more electronic control processors of the plurality of electronic control processors, and generating first transaction data including information indicating the detected switching, and a first identifier indicating the vehicle, and transmitting the first transaction data to the one authentication server. Each of the at least one authentication servers includes a second processor comprising a memory which includes instruction that, when executed by the second processor, causes the second processor to perform operations including: communicating with each of the one or more vehicles, verifying validity of transaction data including the first transaction data obtained from at least one vehicle of the one or more vehicles, and recording the transaction data, of which the validity has been verified, in a storage device. Accordingly, history of switching of driving modes of a vehicle can be recorded in a storage device, so switching of driving modes in the vehicle can be managed in a sure manner.

An arrangement may be made, for example, when the second processor has recorded a second identifier uniquely identifying each of the one or more vehicles in the storage device beforehand, verifying whether the first identifier included in the first transaction data is included in the second identifier, and the validity of the first transaction data. When the second processor verifies that the first identifier is included in the second identifier, and verifies the validity of the first transaction data, records the first transaction data in the storage device.

An arrangement may be made, for example, where each of the one or more vehicles further includes an user interface for accepting input information, the user interface transmits the input information, which is information indicating approval of continuing in the automatic driving mode to which the driving mode has switched, to the first processor, and the first processor generates second transaction data including the input information, and transmits the second transaction data to the one authentication server.

When switching information indicating switching detected by the first processor indicates switching from the manual driving mode to the automatic driving mode, the first processor may, for example, generate the first transaction data that includes, in addition to the switching information and the first identifier indicating the vehicle, information indicating an automatic driving level in the automatic driving mode, and the first processor may transmit the first transaction data to the one authentication server.

When switching information indicating switching detected by the first processor indicates switching from the manual driving mode to the automatic driving mode, the first processor may, for example, generate the first transaction data that includes, in addition to the switching information and the first identifier indicating the vehicle, information indicating a driving assistance function that operates in the automatic driving mode, and the first processor may transmit the first transaction data to the one authentication server.

An arrangement may be made, for example, where each of the one or more vehicles further includes a sensor that obtains sensor information indicating information relating to the driver of the vehicle, the sensor transmits the sensor information to the first processor, and the first processor generates the first transaction data that includes the information indicating switching, the first identifier, and the sensor information, and transmits the first transaction data to the one authentication server.

The second processor may, for example, record a second identifier that uniquely identifies each of the one or more vehicles in a recording device beforehand, and when the first identifier included in the first transaction data is not included in the second identifier, the second processor may provide a notification to the effect that the first identifier is not included in the second identifier.

The first processor may, for example, further generate transaction data including the first transaction data as blockchain transaction data, and the second processor may record the transaction data including the first transaction data as blockchain transaction data.

Embodiments will be described in detail below with reference to the drawings. Note that the embodiments described below are all general or specific examples of the present disclosure. Values, shapes, materials, components, arrangement and connection forms of components, steps, orders of steps, and so forth in the following embodiments are only exemplary, and do not restrict the present disclosure. Components in the following embodiments which are not included in an independent Claim indicating the highest concept are described as being optional components.

Embodiment 1.1 System Configuration

First, the system configuration of the present disclosure will be described. The driving management system according to the present disclosure manages switching of driving modes, which is switching between an automatic driving mode and a manual driving mode of a vehicle, in a sure manner. The driving management system and so forth according to an embodiment will be described below with reference to the drawings.

1.1.1 Overall Configuration of Driving Management System 10

FIG. 1 is a diagram illustrating an example of the configuration of a driving management system 10 according to the embodiment. The driving management system 10 has one or more authentication servers, and one or more vehicles capable of switching between manual driving an automatic driving. In the present embodiment, the management system 10 has vehicles 100a, 100b, and 100c, authentication servers 200a, 200b, and 200c, and an automaker server 300. The vehicles 100a and so on are connected with the authentication servers 200a and so on, the authentication servers 200a and so on are connected to each other, and the automaker server 300 is connected with the authentication servers 200a and so on, by a network N. The authentication servers 200a, 200b, and 200c are respectively connected to storage devices 201a, 201b, and 201c. The authentication servers 200a and so on may be connected to the storage devices 201a and so on via the network N, or may contain the storage devices 201a within. Blockchain transactions and blocks are electronically recorded in the storage device 201a.

1.1.2 Configuration of Vehicle 100a

The vehicles 100a and so on are automobiles capable of switching between manual driving and automatic driving for example, but are not restricted to this. The vehicles 100a and so on may be motorcycles, ships, or the like, that are capable of switching between manual driving and automatic driving. That is to say, it is sufficient for the vehicles 100a and so on to be capable of switching between the manual driving mode where the driver controls traveling of the vehicle, and an automatic driving mode where the automobile is autonomously traveling. It is also sufficient for the vehicle 100a and so on to be an arrangement where multiple ECUs are connected to a network within the vehicle 100a, and where in the automatic driving mode, multiple ECUs cooperate to carry out traveling driving control of the vehicle 100a automatically.

Figure 2:
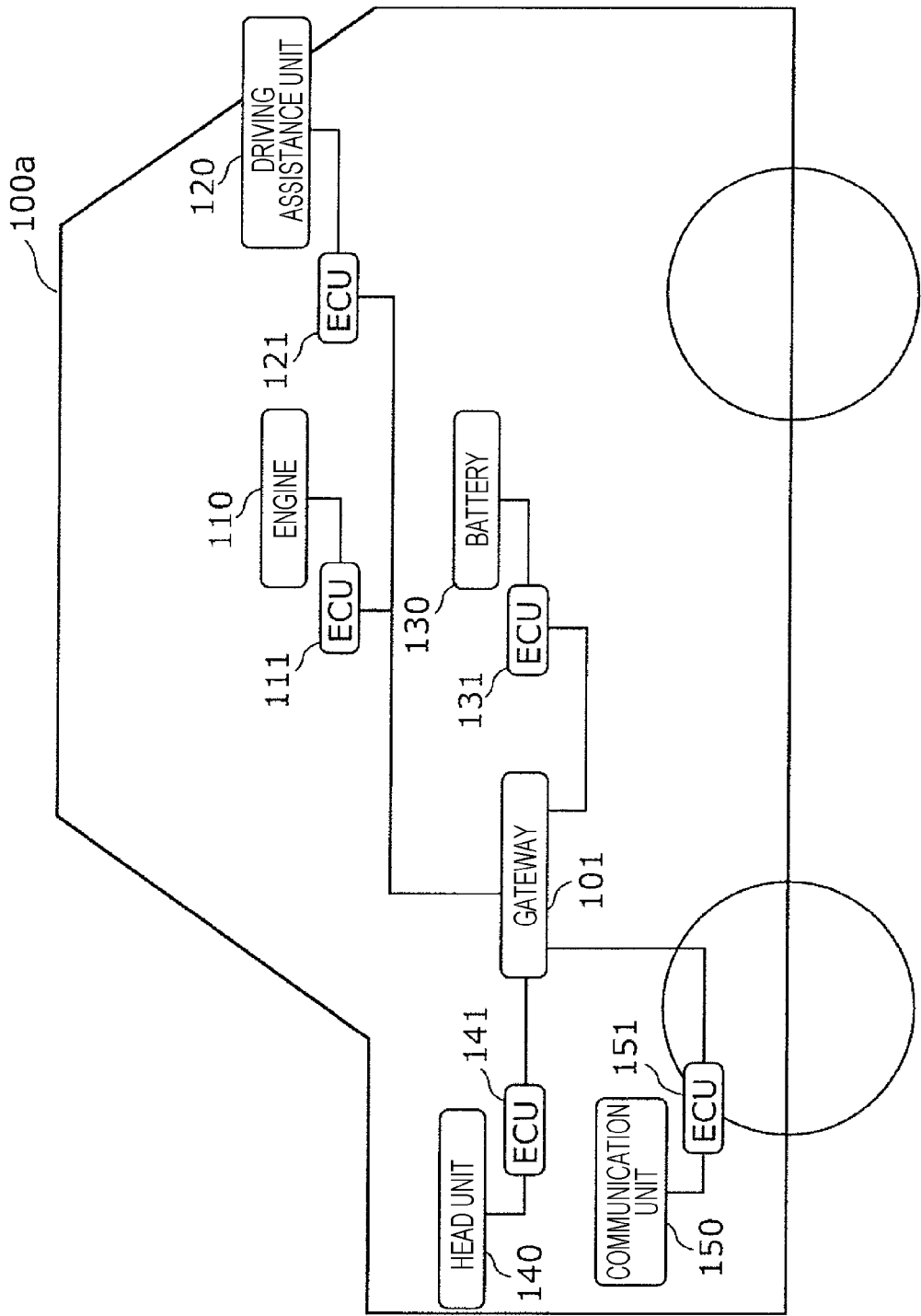
FIG. 2 is a diagram illustrating an example of the overall configuration of an onboard network system that a vehicle has in the embodiment.

FIG. 2 is a diagram illustrating an example of the overall configuration of the onboard network system that the vehicle 100a has in the present embodiment. The vehicles 100b and 100c are also of the same configuration, so vehicle 100a will be described exemplarily.

Multiple electronic control units are connected by a network within the vehicles 100a and so on. Specifically, an ECU 111, an ECU 121, an ECU 131, an ECU 141, an ECU 151, which are multiple electronic control units, and a gateway 101 are connected by an onboard network. The onboard network may be a CAN, an Ethernet (registered trademark), or an arrangement where CAN and Ethernet (registered trademark) coexist. Note that even in a case where the onboard network contains Ethernet (registered trademark), messages may be transmitted by broadcasting.

Drive system ECUs relating to control of fuel, such as an engine 110, a battery 130, an electric motor that is omitted from illustration, and so forth, are connected to the onboard network, for example. In the example illustrated in FIG. 2, the ECU 111 for the engine 110 and the ECU 131 for the battery 130 are connected to the onboard network.

Also, a driving assistance unit 120, and safety-and-comfort function system ECUs, for automatic braking, lane keeping, inter-vehicular distance functions, collision avoidance functions, airbags, and so forth, which are omitted from illustration, are connected to the onboard network. The ECU 121 for the driving assistance unit 120 is connected to the onboard network in the example illustrated in FIG. 2. In the present embodiment, for example, when the driving assistance function of the driving assistance unit 120 goes on and the driving mode of the vehicle 100a switches between automatic driving mode and manual driving mode, the ECU 121 for the driving assistance unit 120 transmits a message to that effect. Note that the ECU 121 for the driving assistance unit 120 may include information to the effect that the driving mode of the vehicle 100a has switched between automatic driving mode and manual driving mode, in a periodically-transmitted message.

An infotainment system ECU, for the head unit 140 and so forth, is connected to the onboard network. In the example illustrated in FIG. 2, the ECU 141 for the head unit 140 is connected to the onboard network. Note that an arrangement may be made where there is no ECU 141 for the head unit 140, and the head unit 140 is directly connected to the onboard network without going through the ECU 141. The head unit 140 has a later-described display unit and input unit, and has a function of displaying screens and accepting input of information with respect to users such as a driver or the like who is in the vehicle 100a, in the present embodiment.

Figure 3:
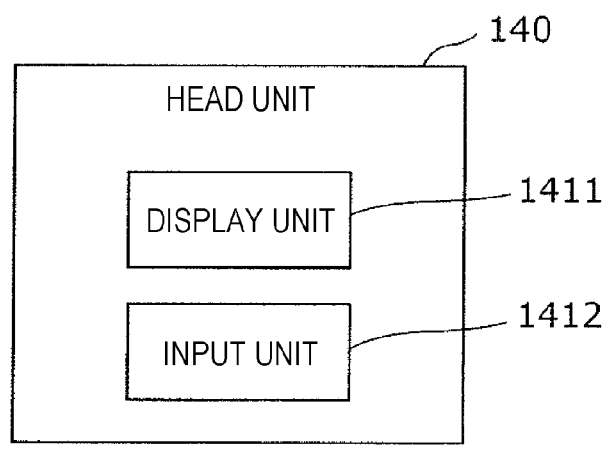
FIG. 3 is a diagram illustrating a part of the functional configuration of a head unit according to the embodiment.

FIG. 3 is a diagram illustrating a part of the functional configuration of the head unit 140 according to the present embodiment. The head unit 140 has a display unit 1411 and an input unit 1412, as illustrated in FIG. 3.

The display unit 1411 displays screens according to screen information transmitted from one of the authentication servers 200a and so on, to the user. In the present embodiment, the display unit 1411 displays screens to notify that the driving mode has switched to the automatic driving mode, and to have the user confirm whether or not to continue the automatic driving mode.

The input unit 1412 accepts input of information. The input unit 1412 transmits information that has been input from the user and that indicates approval of continuing in the automatic driving mode to which the driving mode has switched, to the gateway 101. Specifically, the input unit 1412 accepts user input of confirmation information that indicates approval or confirmation of continuing in the automatic driving mode to which the driving mode has switched, in a screen displayed on the display unit 1411. The input unit 1412 then transmits the input confirmation information to the gateway 101, or to the authentication servers 200a and so on via the gateway 101.

A communication system ECU for a communication unit 150 or the like that has communication functions of communicating with the authentication server 200a and so on is connected to the onboard network. In the example illustrated in FIG. 2, the ECU 151 for the communication unit 150 is connected to the onboard network.

Note that the above-described ECU 111 through ECU 151 may be configured integrally with the parts to which they connect, i.e., as a single part. For example, the engine 110 and the ECU 111 connected thereto may be configured as a single part. This holds true for the other ECUs, as well.

These multiple electronic control units, i.e., ECU 111 through ECU 151 obtain the state and so forth of what they are connected to, and transmit messages of the obtained state and so forth, either periodically or irregularly. For example, the ECU 111 obtains revolutions of the engine 110 as the state and so forth, and periodically transmits messages indicating the revolutions. Also, when the driving assistance function of the driving assistance unit 120 turns on, for example, the ECU 121 transmits a message to that effect.

1.1.3 Configuration of Gateway 101

Next, the gateway 101 connected to the onboard network will be described. FIG. 4 is a block diagram illustrating the function configuration of the gateway 101 according to the present embodiment. The gateway 101 is installed in the vehicles 100a and so on, and has a detection unit 1101, a transaction data generating unit 1102, and a first communication unit 1103, as illustrated in FIG. 4. The components will be described below.

Detection Unit 1101

The detection unit 1101 detects switching between the manual driving mode where manual driving is performed, and the automatic driving mode where automatic driving is performed, based on messages issued by one or more electronic control unit out of the multiple electronic control units. In the example in FIG. 2, the detection unit 1101 detects switching of the driving mode as switching of the assistance function of the driving assistance unit 120, from messages transmitted by the ECU 121 connected to the onboard network. Switching of the driving mode includes switching from the manual driving mode to the automatic driving mode, and switching from the automatic driving mode to the manual driving mode.

More specifically, an arrangement may be made where the detection unit 1101 detects switching from the manual driving mode to the automatic driving mode in a case of having detected that the automatic driving function has turned on during manual driving, from messages transmitted by the ECU 121 connected to the onboard network. Also, an arrangement may be made where the detection unit 1101 detects switching from the automatic driving mode to the manual driving mode in a case of having detected that the manual driving has been performed by the driver during automatic driving, from messages transmitted by the ECU 121 connected to the onboard network. The detection unit 1101 may also detect switched to a parking mode where the vehicle 100a and so on automatically parks by an automatic parking function, or the like, as switching of the assistance function of the driving assistance unit 120.

Note that there are several methods conceivable to detect whether or not the assistance function of the driving assistance unit 120 has been switched. For example, the detection unit 1101 may detect whether or not the assistance function of the driving assistance unit 120 has been switched from messages that the ECU 121 for the driving assistance unit 120, which is connected to the onboard network, transmits. Also, the detection unit 1101 may detect whether or not the assistance function of the driving assistance unit 120 has been switched from information of sensors (omitted from illustration) installed on the outside of the vehicle 100a and so on or messages that an ECU for the sensors transmits.

In the present embodiment, in a case of having detected switching of the assistance function of the driving assistance unit 120, the detection unit 1101 transmits switching information, which is information indicating this switching, to the transaction data generating unit 1102. The switching information includes information indicating switching between the manual driving mode and automatic driving mode, and so forth.

Transaction Data Generating Unit 1102

The transaction data generating unit 1102 generates first transaction data including switching information detected by the detection unit 1101 and a first identifier identifying the vehicle. The transaction data generating unit 1102 transmits the generated first transaction data to one of the authentication server 200a and so on via the first communication unit 1103. The transaction data generating unit 1102 also generates the first transaction data as blockchain transaction data.

In the present embodiment, the transaction data generating unit 1102 generates the first transaction data that is blockchain transaction data, from switching information obtained from the detection unit 1101. Assumption will be made here that the switching information is information indicating switching of the driving mode. In this case, the first transaction data includes the switching information indicating that the driving mode has been switched, the point in time that the switching occurred, the first identifier identifying the vehicle 100a and so on, and a signature for information including these.

Now, a signature key necessary for generating this signature may be stored at the gateway 101 beforehand. Alternatively, the signature key necessary for generating this signature may be generated based on secret information input at the input unit 1412 of the head unit 140.

The switching information indicating switching of the driving mode may be information indicating switching from the automatic driving mode to the manual driving mode, or may be information indicating switching from the manual driving mode to the automatic driving mode. The switching information also may be information indicating switching of assistance functions of the driving assistance unit 120 other than switching of the driving mode. In this case, information indicating which driving assistance function out of the assistance functions of the driving assistance unit 120 is used as a switched driving assistance function may further be included in the switching information.

The transaction data generating unit 1102 may generate the second transaction data including blockchain transaction data, which is later-described confirmation information, from the confirmation information obtained from the head unit 140, and transmit this to the authentication servers 200a and so on via the first communication unit 1103. The transaction data generating unit 1102 may generate the second transaction data including the confirmation information so as to include user approval information, for example. This user approval information is information indicating that the user has confirmed switching from the manual driving mode to the automatic driving mode, and approved continuing in this automatic driving mode, for example.

First Communication Unit 1103

The first communication unit 1103 performs communication with at least one authentication server, out of the one or more authentication servers 200a and so on. More specifically, the first communication unit 1103 is a communication interface that performs communication with at least one of the authentication servers 200a and so on via the communication unit 150 connected to the onboard network system. This communication may be carried out by Transport Layer Security (TLS). In this case, the communication unit 150 or first communication unit 1103 may store an encryption key for TLS communication.

1.1.4 Configuration of Authentication Server 200a

Next, the authentication server 200a and so on will be described. FIG. 5 is a block diagram illustrating the function configuration of the authentication server 200a according to the present embodiment. The authentication servers 200b and 200c are also of the same configuration, so the authentication server 200a will be described exemplarily.

The authentication server 200a includes a screen generating unit 211, a transaction data verifying unit 212, a transaction data generating unit 213, a block generating unit 214, a synchronizing unit 215, a recording unit 216, and a second communication unit 217, as illustrated in FIG. 5. The authentication server 200a can be realized by a processor executing a predetermined program using memory. The components will be described below.

Screen Generating Unit 211

In a case where judgement has been made that the driving mode has switched from the manual driving mode to the automatic driving mode, from switching information included in the first transaction data obtained from the vehicle 100a and so on, the screen generating unit 211 generates a screen for display to the user. For example, the screen generating unit 211 generates a screen that notifies the user who is a passenger of the vehicle 100a and so on that the driving mode has switched to the automatic driving mode, and also confirms whether or not to continue in the automatic driving mode. The screen generating unit 211 then transmits screen information representing the generated screen to the gateway 101 of the vehicle 100a via the second communication unit 217.

Transaction Data Verifying Unit 212

The transaction data verifying unit 212 is an example of a verifying unit, and verifies the validity of transaction data including the first transaction data obtained from at least one vehicle 100a out of one or more vehicles. For example, the transaction data verifying unit 212 verifies whether the first identifier included in the first transaction data is included in the second identifier, and the validity of the first transaction data. In a case where the first identifier included in the first transaction data is not included in the second identifier, the transaction data verifying unit 212 notifies, via the second communication unit 217, to the effect that the first identifier is not included in the second identifier.

The transaction data verifying unit 212 verifies the validity of the first transaction data obtained from the vehicle 100a and so on in the present embodiment. More specifically, upon obtaining the first transaction data from the vehicle 100a and so on, the transaction data verifying unit 212 verifies whether the signature included in the first transaction data, i.e., the authentication information, is valid. The transaction data verifying unit 212 also verifies whether the first identifier is valid, upon obtaining the first transaction data. In further detail, the transaction data verifying unit 212 verifies whether the first identifier included in the first transaction data is included in the second identifier indicating a legitimate vehicle, recorded in the recording unit 216 beforehand. Thus, whether the vehicle indicated by the first identifier included in the first transaction data is a vehicle that can switch between manual driving mode and automatic driving mode, and that has been legitimately registered, can be verified.

In a case where the transaction data verifying unit 212 has confirmed the validity of the obtained first transaction data as a result of having performed the verification, the transaction data verifying unit 212 records the first transaction data in the recording unit 216, and notifies the synchronizing unit 215 of the first transaction data.

In the same way, the transaction data verifying unit 212 verifies the validity of the second transaction data obtained from the vehicle 100a and so on. In a case where the transaction data verifying unit 212 has confirmed the validity of the second transaction data as a result of having performed the verification, the transaction data verifying unit 212 records the first transaction data in the recording unit 216, and notifies the synchronizing unit 215 of the second transaction data.

In the same way, the transaction data verifying unit 212 also verifies the validity of third transaction data obtained from the automaker server 300. In a case of having confirmed the validity of the third transaction data as a result of having performed the verification, the transaction data verifying unit 212 can record the third transaction data in the recording unit 216, and notify the synchronizing unit 215 of the second transaction data. The second transaction data and third transaction data will be described in detail later.

Transaction Data Generating Unit 213

In a case of having obtained confirmation information from the vehicle 100a and so on, the transaction data generating unit 213 may generate second transaction data including this confirmation information. In this case, the transaction data generating unit 213 may generate the second transaction data including this confirmation information so as to further include user approval information. This approval information is information indicating that the user has confirmed switching form the manual driving mode to the automatic driving mode, and has approved or confirmed continuing in the automatic driving mode.

Note that this second transaction data is not restricted to being generated by the transaction data generating unit 213, and may be generated at the gateway 101 of the vehicles 100a and so on, as described above. The generated second transaction data generated by the gateway 101 may be obtained by the transaction data generating unit 213 from the vehicles 100a and so on, or may be obtained by the block generating unit 214.

Block Generating Unit 214

The block generating unit 214 executes a consensus algorithm among multiple authentication servers. A consensus algorithm called Practical *Byzantine* Fault Tolerance (PBFT) may be used, or another known consensus algorithm may be used. The block generating unit 214 executes a consensus algorithm between the authentication server 200a, authentication server 200b, and authentication server 200c in the present embodiment.

The block generating unit 214 first generates a block for the blockchain including one or more transaction data. In a case where a consensus has been reached by the consensus algorithm, the block generating unit 214 then records in the recording unit 216. The block generated by the block generating unit 214 is linked to the blockchain recorded in the recording unit 216, and recorded.

Figure 6A:
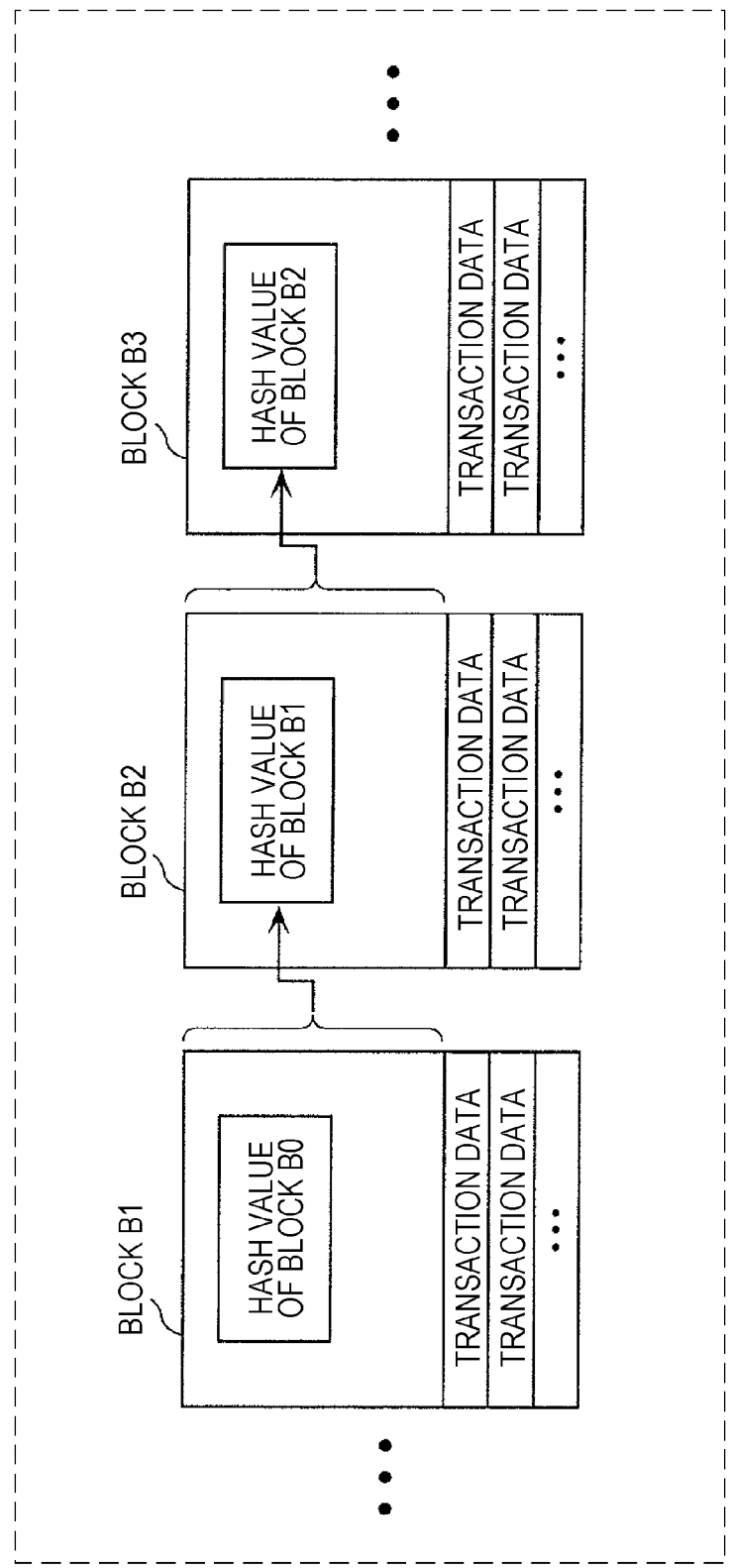
FIG. 6A is an explanatory diagram illustrating a data structure of a block chain.

Now, the data structure of a blockchain, and the data structure of transaction data will be described. FIG. 6A is an explanatory diagram illustrating the data structure of a blockchain. A blockchain is blocks, which are recording increments thereof, linked onto a chain. Each block has multiple transaction data, and the hash value of the immediately-preceding block. Specifically, block B2 includes the hash value of the block B1 that precedes it. A hash value computed from the multiple transaction data included in the block B2 and the hash value of the block B1 is included in the block B3 as the hash value of the block B2. Linking blocks as a chain while including the contents of the previous block as a hash value enables tampering with the linked transaction data to be effectively prevented.

If past transaction data is changed, the hash value of the block will be a different value as compared to before changing. In order to make the falsified block appear to be legitimate, all subsequent blocks must be recreated, and this task is extremely difficult from a practical perspective.

Figure 6B:
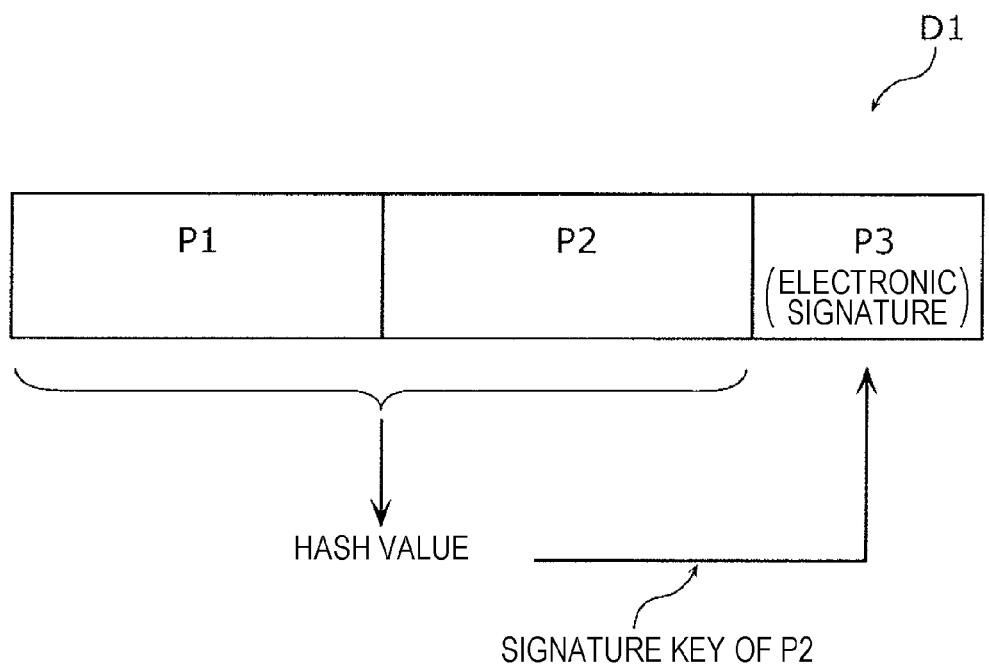
FIG. 6B is an explanatory diagram illustrating a data structure of transaction data.

The transaction data according to the present embodiment is the first transaction data including switching information, the second transaction data that indicates user conformation information, and third transaction data relating to registration of legitimate vehicles, which will be described later, and so on. FIG. 6B is an explanatory diagram illustrating the data structure of transaction data. The transaction data D1 in FIG. 6B is an example of first transaction data including switching information indicating switching of the driving mode, for example. The transaction data D1 includes an address P1 indicating a keeper, an address P2 indicating a recipient, and an electronic signature P3 generated by applying a signature by the signature key of the keeper to the hash value of the addresses P1 and P2. Note that the address P1 will be blank for transaction data when new transaction data is being generated.

Synchronizing Unit 215

The synchronizing unit 215 performs synchronization of blocks in blockchains among multiple authentication servers, and synchronization of transaction data. Synchronization of transaction data in blockchains among multiple authentication servers is performed by a peer-to-peer architecture, and recorded in the recording unit 216.

For example, in a case where the validity of the first transaction data obtained from the vehicle 100a is verified by the transaction data verifying unit 212, the synchronizing unit 215 transfers a duplicate of the first transaction data to the other authentication servers 200b and 200c. Accordingly, the verified first transaction data can be recorded in the recording units 216 of the other authentication servers 200b and 200c. Also, when first transaction data is obtained from the other authentication servers 200b and 200c, the synchronizing unit 215 records the obtained first transaction data in the recording unit 216. This is the same for the second transaction data and third transaction data as well, so description thereof will be omitted.

Recording Unit 216

The recording unit 216 records the first transaction data, second transaction data, and third transaction data as blocks of blockchains in the storage device 201a. The storage device 201a may be configured within the recording unit 216, or may be configured outside of the authentication server 200a as illustrated in FIG. 1.

In the present embodiment, the recording unit 216 records the transaction data including the first transaction data, second transaction data, and third transaction data, of which the validity has been confirmed by the transaction data verifying unit 212, for example, in the storage device 201a. The recording unit 216 records the transaction data including the first transaction data, second transaction data, and third transaction data, as blockchain transaction data.

The recording unit 216 may have second identifiers uniquely identifying each of the one or more vehicles recorded in the storage device 201a beforehand. Vehicles indicated by second identifiers recorded beforehand are vehicles that the automaker has certified, and are legitimate vehicles capable of switching between manual driving mode and automatic driving mode with operations guaranteed, for example.

More specifically, in a case where the transaction data verifying unit 212 has confirmed that the first identifier is included in a second identifier, and that the validity of the first transaction data has been confirmed, the recording unit 216 may record the first transaction data in the storage device 201a. Accordingly, switching of driving modes in a legitimate vehicle will be recorded in the storage device 201a in a sure manner.

Second Communication Unit 217

The second communication unit 217 is a communication interface that performs communication with vehicles 100a and so on and the automaker server 300. This communication may be performed using TLS. In this case, the encryption key for TLS communication may be stored in the second communication unit 217.

The second communication unit 217 performs communication with each of the one or more vehicles 100a and so on in the present embodiment. In a case where the transaction data verifying unit 212 confirms that the first identifier is not included in the second identifier, and also confirms the validity of the first transaction data, the second communication unit 217 makes notification to the effect that the first identifier is not included in the second identifier. Accordingly, judgment can be made that the vehicle is not legitimate or that switching of the assistance functions of the driving assistance unit 120 including switching of the driving mode was unauthorized.

1.1.5 Configuration of Automaker Server 300

Next, the automaker server 300 will be described. FIG. 7 is a block diagram illustrating the functional configuration of the automaker server 300 according to the present embodiment. The automaker server 300 has an input unit 311, a transaction data generating unit 312, and a third communication unit 313, as illustrated in FIG. 7. The automaker server 300 can be realized by a processor executing a predetermined program using memory. The components are described below.

Input Unit 311

The input unit 311 accepts input relating to a legitimate vehicle that the automaker manages and that is capable of switching between manual driving and automatic driving, and transmits this to the transaction data generating unit 312. More specifically, the input unit 311 accepts input of a second identifier that uniquely identifies each of multiple legitimate vehicles, which are managed by the automaker. The input unit 311 then transmits the input second identifier to the transaction data generating unit 312.

Transaction Data Generating Unit 312

The transaction data generating unit 312 generates third transaction data including the second identifier obtained from the input unit 311 and indicating registration of legitimate vehicles as blockchain transaction data. The transaction data generating unit 312 generates the third transaction data indicating registration of legitimate vehicles, including the second identifier and a signature of the automaker server 300. Note that a signature is an example of authentication information, so in a case where a password that the automaker server 300 inputs is obtained, the hash value of this password may be used, or the signature may be generated using a signature key generated from this password.

Third Communication Unit 313

The third communication unit 313 is a communication interface that communicates with the vehicles 100a and so on and the authentication servers 200a and so on. This communication may be performed using TLS. In this case, the encryption key for TLS communication may be stored in the third communication unit 313.

1.2 Operations, Etc.

The processing operations of the driving management system 10 configured as described above will be described next.

1.2.1 Registration Processing Between Automaker Server 300 and Authentication Servers 200a and so on First, registration processing of registering the second identifier that uniquely identifies legitimate vehicles capable of switching between manual driving and automatic driving in the authentication servers 200a and so on will be described. Description will be made here regarding a case of the automaker server 300 transmitting third transaction data including the second identifier to the authentication server 200a which is one of the authentication servers 200a and so on.

Figure 8A:
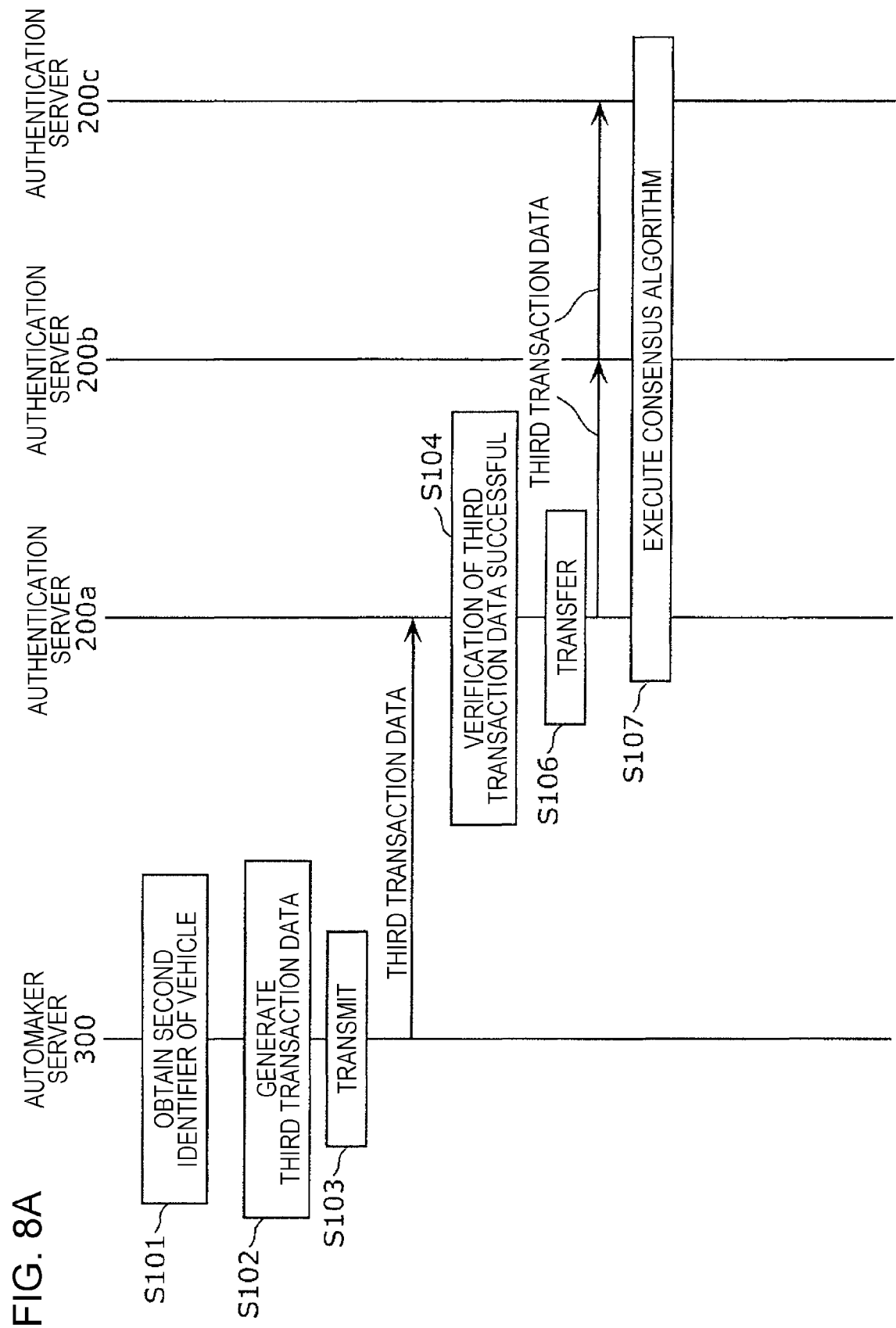
FIG. 8A is a sequence diagram illustrating registration processing between the automaker server and authentication server in the embodiment.
Figure 8B:
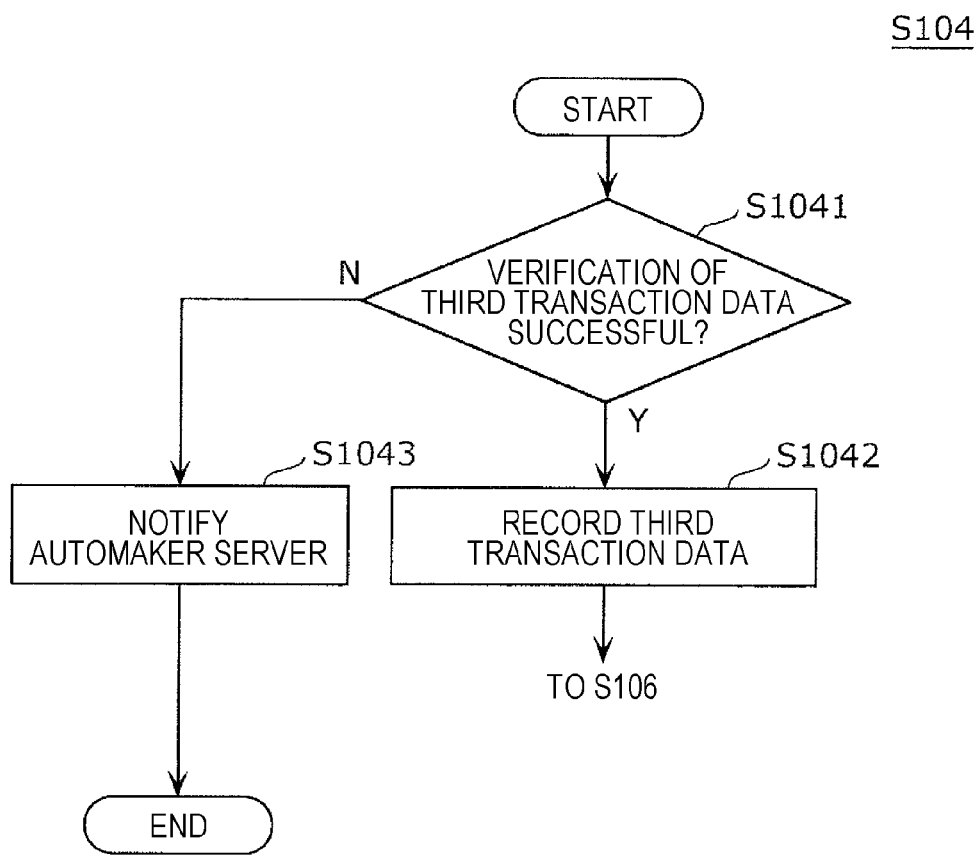
FIG. 8B is a flowchart illustrating detailed processing of step S104 in FIG. 8A.

FIG. 8A is a sequence diagram illustrating registration processing between the automaker server 300 and authentication servers 200a and so on according to the present embodiment. FIG. 8B is a flowchart illustrating detailed processing of step S104 in FIG. 8A.

First, in step S101, the automaker server 300 obtains the second identifier indicating a legitimate vehicle capable of switching between manual driving and automatic driving.

Next, in step S102, the automaker server 300 generates third transaction data including the second identifier indicating the legitimate vehicle that has been obtained. The third transaction data is generated including the second identifier, signature of the automaker server 300, and so forth, for example, in the present embodiment.

The automaker server 300 then transmits the generated third transaction data to the authentication server 200a in step S103. Although FIG. 8A illustrates an example of the automaker server 300 transmitting the generated third transaction data to the authentication server 200a, this is not restrictive. Transmission may be made to any one of the authentication servers 200a and so on.

Then in step S104, the authentication server 200a verifies the third transaction data that has been obtained, and if successful, records the third transaction data in the recording unit 216. The flow then advances to step S106.

The detailed processing in step S104 will be described here with reference to FIG. 8B. The authentication server 200a first performs verification of the obtained third transaction data, and confirms if successful or not (S1041). More specifically, the authentication server 200a verifies whether the second identifier included in the third transaction data is valid, and whether the signature of the automaker server 300 included in the third transaction data is valid. That is to say, the authentication server 200a verifies whether or not the second identifier and signature are valid. In a case where the authentication server 200a has confirmed that the second identifier and signature are valid in step S1041, and verification of the third transaction data is successful (Yes in S1041), the authentication server 200a records the third transaction data in the recording unit 216 (S1042), and the flow advances to step S106. In a case where verification of the third transaction data is not successful in step S1041 (No in S1041), the authentication server 200a notifies the automaker server 300 to that effect (S1043), and the registration processing ends.

Next, the authentication server 200a transmits duplicates of the obtained third transaction data to the other authentication servers 200b and 200c in step S106. Note that the other authentication servers 200b and 200c also verify the third transaction data transferred thereto and obtained. This verification processing is the same as the processing described with reference to FIG. 8B.

In step S107, the authentication server 200a, authentication server 200b, and authentication server 200c execute a consensus algorithm. Execution of the consensus algorithm verifies that the third transaction data obtained by the authentication server 200a, authentication server 200b, and authentication server 200c is valid transaction data. The authentication servers 200a, 200b, and 200c generate a block including the verified third transaction data. Thus, a block of the third transaction data including the second identifier indicating a legitimate vehicle capable of switching between manual driving and automatic driving is generated, so whether a legitimate vehicle can be judged by referencing the blockchain.

1.2.2 Verification Processing Between Vehicle 100a and Authentication Servers 200a and so on Next, processing in a case where switching of the driving mode of the vehicle 100a has been detected, and this switching verified among the vehicle 100a and authentication servers 200a and so on will be described. A case of transmitting first transaction data including switching information indicating this switching and the first identifier of the vehicle 100a, from the vehicle 100a to the authentication server 200a which is one out of the authentication servers 200a and so on will be described here.

Figure 9B:
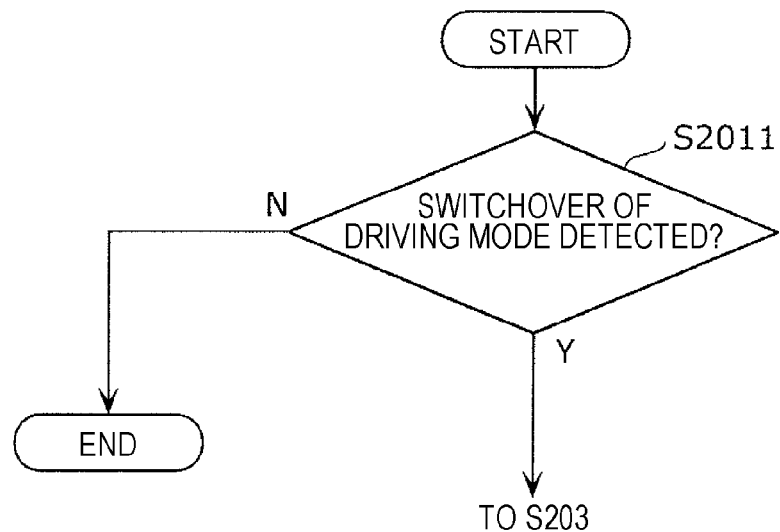
FIG. 9B is a flowchart illustrating detailed processing of step S201 in FIG. 9A.
Figure 9C:
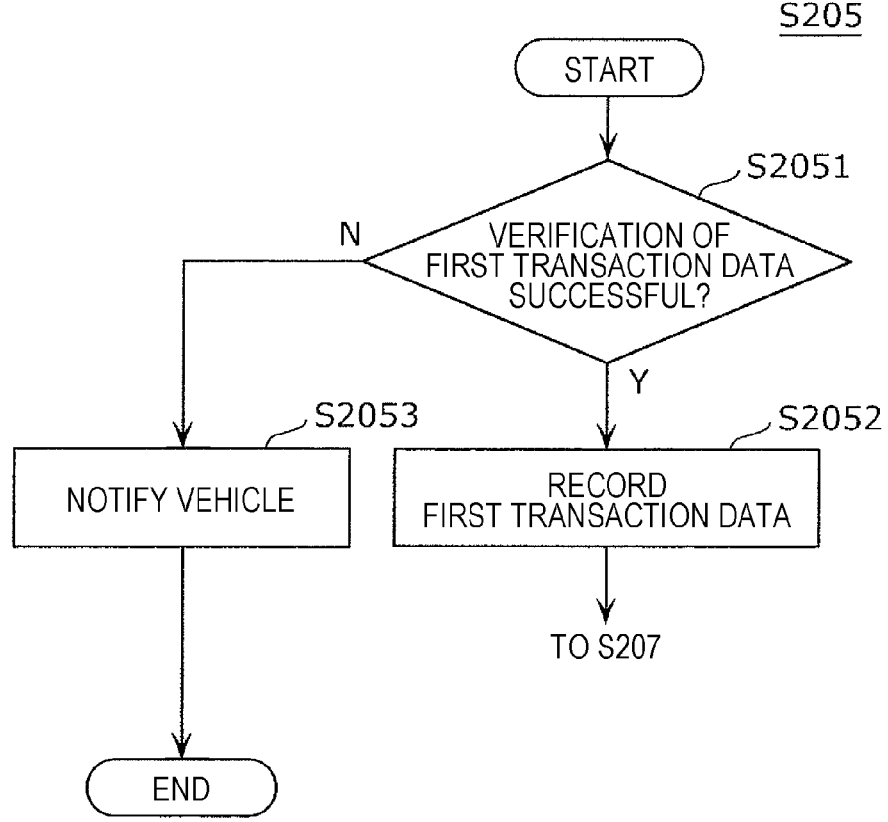
FIG. 9C is a flowchart illustrating detailed processing of step S205 in FIG. 9A.

FIG. 9A is a sequence diagram illustrating first verification processing between the vehicle 100a and the authentication servers 200a and so on in the present embodiment. FIG. 9B is a flowchart illustrating detailed processing of step S201 in FIG. 9A. FIG. 9C is a flowchart illustrating detailed processing of step S205 in FIG. 9A. The first verification processing will be described here as processing from detection of switching of the driving mode of the vehicle 100a up to verification of the first transaction data including switching information indicating this switching.

First, in step S201, the gateway 101 of the vehicle 100a detects that switching of the driving mode has been performed in the vehicle 100a. Detailed processing of step S201 will be described with reference to FIG. 9B. The gateway 101 of the vehicle 100a first confirms whether switching of the driving mode that is switching of the assistance function of the driving assistance unit 120 has been detected from messages transmitted by the ECU 121 for the driving assistance unit 120 connected to the onboard network. (S2011). In a case where switching of the driving mode has been detected in step S2011 (Yes in S2011), the gateway 101 advances to step S203. In a case where switching of the driving mode is not detected in step S2011 (No in S2011), the gateway 101 ends the first verification processing.

The gateway 101 of the vehicle 100a then in step S203 generates the first transaction data including the switching information indicating switching of the driving mode, and the first identifier indicating the vehicle 100a. In the present embodiment, the first transaction data is generated including the switching information and first identifier, and authentication information such as a signature for information including this switching information and first identifier, for example.

Then in step S204, the gateway 101 of the vehicle 100a transmits the generated first transaction data to the authentication server 200a. Although FIG. 9A shows an example where the vehicle 100a transmits the generated first transaction data to the authentication server 200a, this is not restrictive. Transmission may be made to any authentication server of the authentication servers 200a and so on.

The authentication server 200a then performs verification of the obtained first transaction data in step S205. If successful, the first transaction data is recorded in the recording unit 216, and the flow advances to step S207.

Detailed processing of step S205 will be described here with reference to FIG. 9C. The authentication server 200a first verifies the obtained first transaction data, and confirms whether or not verification is successful (S2051). More specifically, the authentication server 200a verifies whether the first identifier included in the first transaction data is included in the second identifier indicating a legitimate vehicle registered in the recording unit 216 beforehand, and the signature included in the first transaction data, are valid. That is to say, the authentication server 200a confirms whether or not the first identifier and signature are valid. In a case where the authentication server 200a confirms that the first identifier and signature are valid in step S2051, and verification of the first transaction data is successful (Yes in S2051), the first transaction data is recorded in the recording unit 216 (S2052), and the flow advances to step S207. Note that in a case where verification of the first transaction data is not successful (No in S2051), the authentication server 200a notifies the gateway 101 of the vehicle 100a to that effect (S2053), and the first verification processing ends. The authentication server 200a may end the first verification processing after making this notification to the automaker server 300, and not just the vehicle 100a. Thus, the automaker server 300 can know of detection of an unauthorized vehicle 100a.

The authentication server 200a transmits duplicates of the obtained first transaction data to the other authentication servers 200b and 200c in step S207. Note that the other authentication servers 200b and 200c also verify the first transaction data transferred thereto and obtained. This verification processing is the same as the processing described with reference to FIG. 9C.

In step S208, the authentication server 200a, authentication server 200b, and authentication server 200c execute a consensus algorithm. Execution of the consensus algorithm verifies that the first transaction data obtained by the authentication server 200a, authentication server 200b, and authentication server 200c is valid transaction data. The authentication servers 200a, 200b, and 200c generate a block including the verified first transaction data.

Figure 10A:
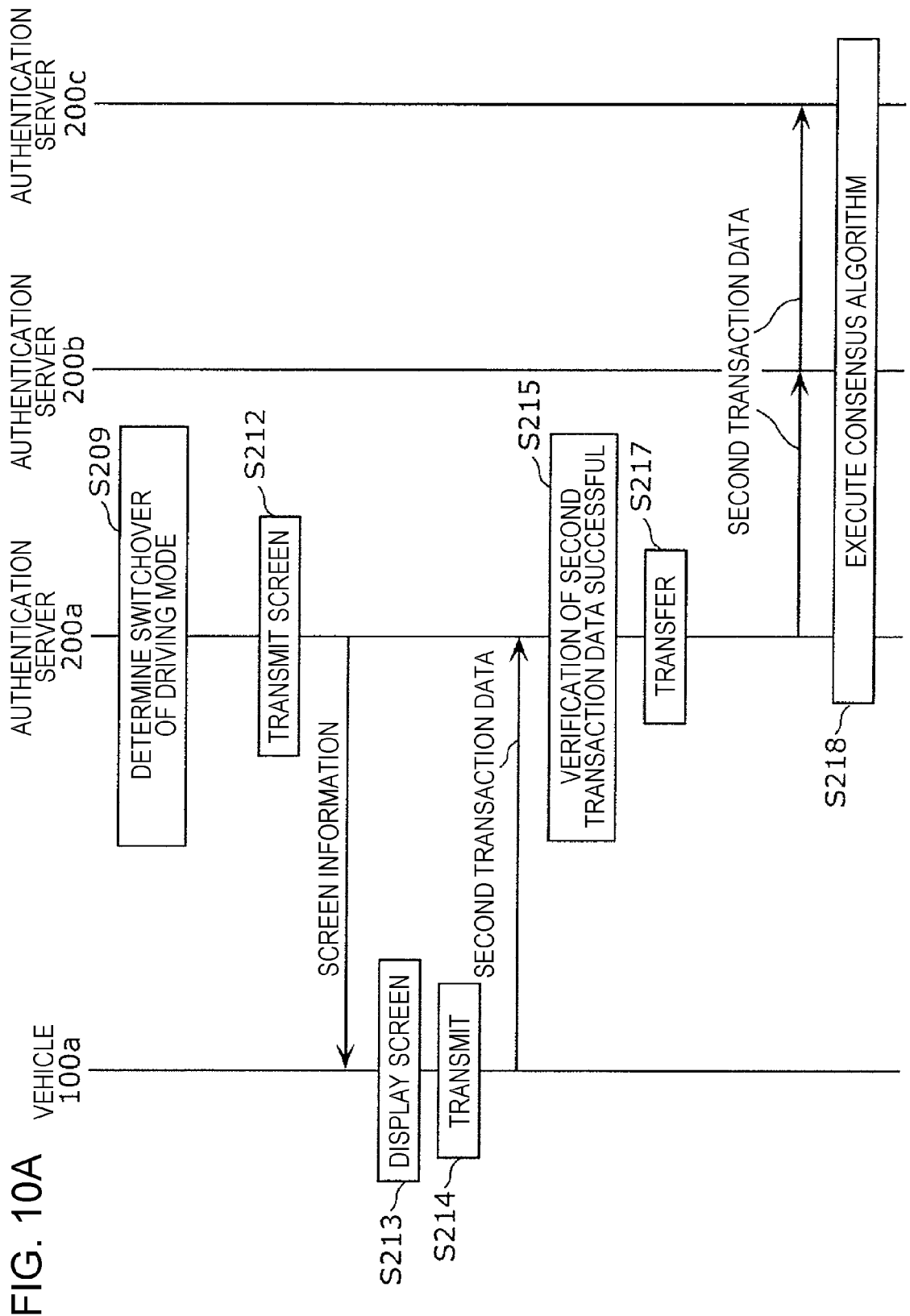
FIG. 10A is a sequence diagram illustrating second verification processing between the vehicle and authentication server in the embodiment.
Figure 10B:
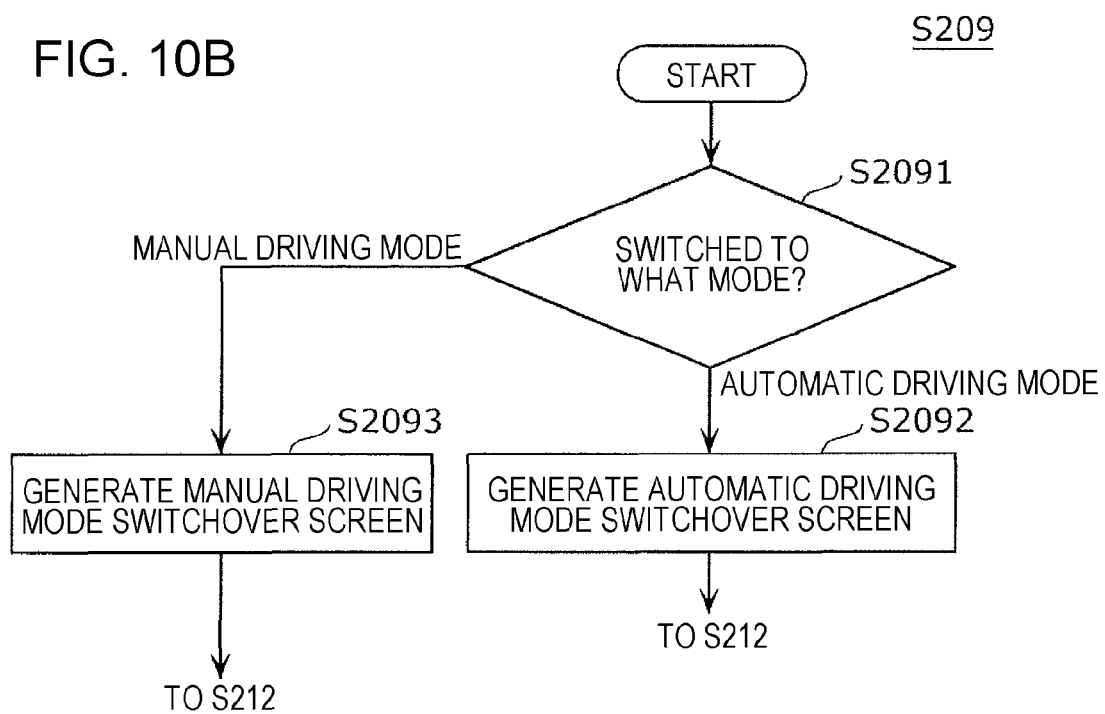
FIG. 10B is a flowchart illustrating detailed processing of step S209 in FIG. 10A.
Figure 10C:
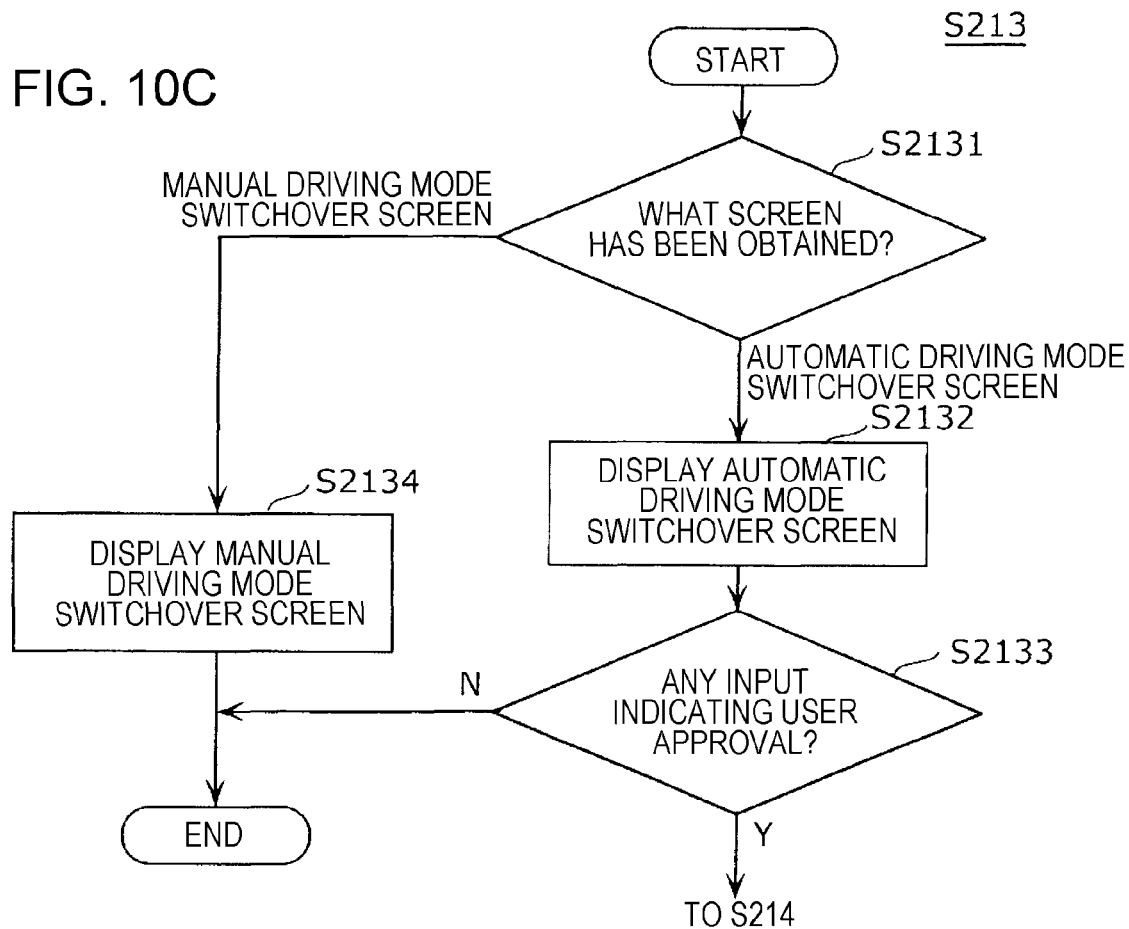
FIG. 10C is a flowchart illustrating detailed processing of step S213 in FIG. 10A.
Figure 10D:
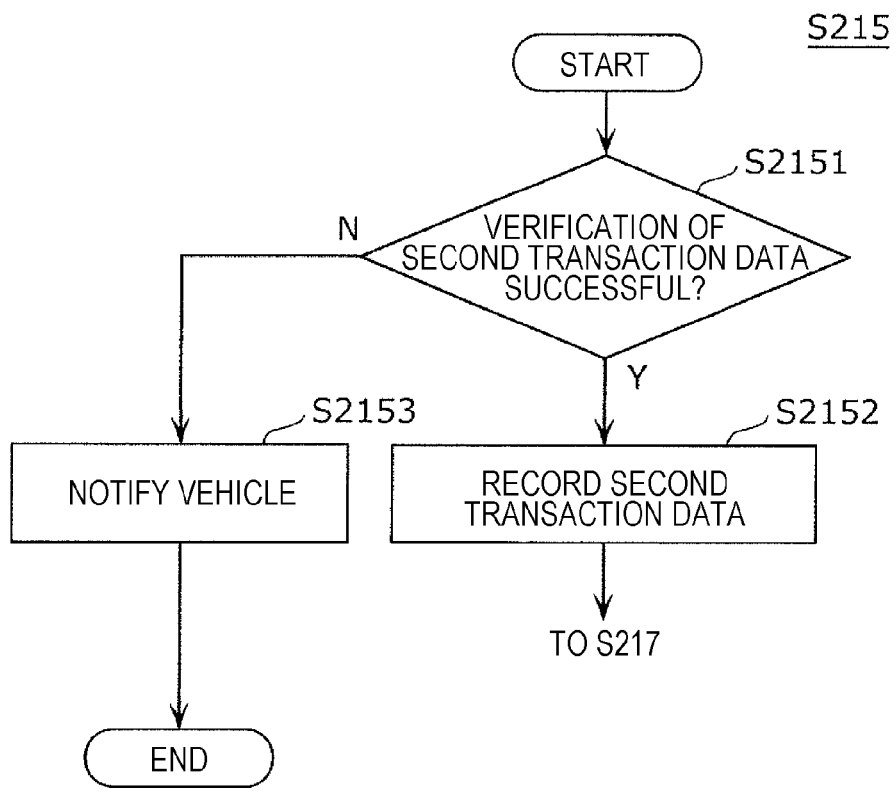
FIG. 10D is a flowchart illustrating detailed processing of step S215 in FIG. 10A.

Next, second verification processing that follows the first verification processing will be described. FIG. 10A is a sequence diagram illustrating the second verification processing between the vehicle 100a and authentication servers 200a and so on in the present embodiment. FIG. 10B is a flowchart illustrating detailed processing of step S209 in FIG. 10A. FIG. 10C is a flowchart illustrating detailed processing of step S213 in FIG. 10A. FIG. 10D is a flowchart illustrating detailed processing of step S215 in FIG. 10A. The second verification processing is performed following the first verification processing where the first transaction data indicating the switching of driving mode is recorded. More specifically, the second verification processing is processing following the first verification processing up to verification of second transaction data including that the user has confirmed switching from the manual driving mode to the automatic driving mode and to continue in the automatic driving mode.

In step S209, the authentication server 200a performs determination of switching of the driving mode included in the first transaction data. Detailed processing of step S209 will be described here with reference to FIG. 10B. The authentication server 200a first confirms whether the driving mode to which switching has been performed is the automatic driving mode or manual driving mode (S2091). More specifically, the authentication server 200a confirms whether the driving mode to which switching has been performed, indicated by the switching information included in the first transaction data regarding which a block has been generated is the automatic driving mode or manual driving mode. In step S2091, if the driving mode to which switching has been performed is the automatic driving mode (automatic driving mode in S2091), the authentication server 200a generates an automatic driving mode switching screen (S2092), and the flow advances to step S212. If the driving mode to which switching has been performed is the manual driving mode in step S2091 (manual driving mode in S2091), the authentication server 200a generates a manual driving mode switching screen (S2093), and the flow advances to step S212.

Next, in step S212, the authentication server 200a transmits screen information indicating the screen generated in step S209 to the vehicle 100a.

The vehicle 100a then displays the screen obtained from the authentication server 200a, in step S213. The vehicle 100a displays this screen at the head unit 140 in the present embodiment.

Detailed processing of step S213 will be described here with reference to FIG. 10C. The vehicle 100a first confirms whether the screen obtained from the authentication server 200a is an automatic driving mode switching screen or a manual driving mode switching screen (S2131). In step S2131, in a case where the screen obtained from the authentication server 200a is the automatic driving mode switching screen (automatic driving mode switching screen in S2131), the vehicle 100a displays the automatic driving mode switching screen (S2132). The automatic driving mode switching screen in the present embodiment is a screen such as illustrated in FIG. 11, for example.

Figure 11:
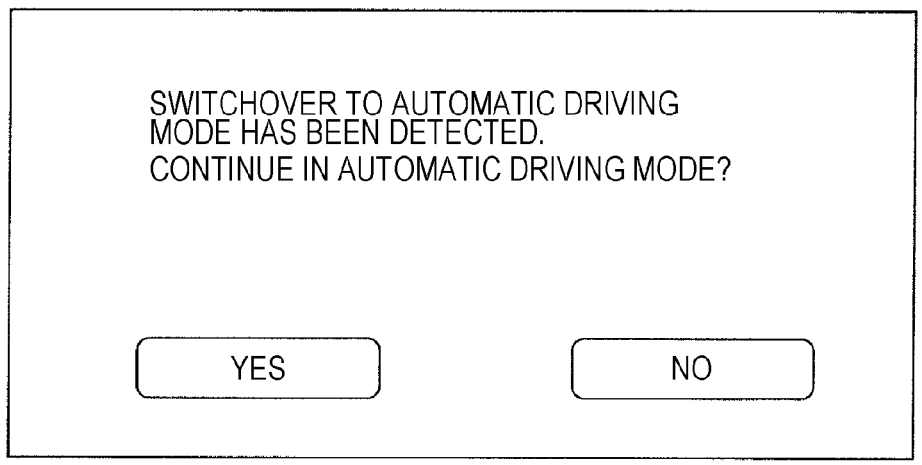
FIG. 11 is a diagram illustrating an example of a screen display displayed in the vehicle in the embodiment.

FIG. 11 is a diagram illustrating an example of a screen display made at the vehicle 100a in the present embodiment. FIG. 11 illustrates an example of a display screen stating, "SWITCHOVER TO AUTOMATIC DRIVING MODE HAS BEEN DETECTED. CONTINUE IN AUTOMATIC DRIVING MODE?". The example illustrated in FIG. 11 is a screen display for confirming with the user that the driving mode has been switched to the automatic driving mode in the vehicle 100a, and to have the user confirm (or approve) continuing to use the automatic driving mode to which the driving mode has been switched. If the user selects "YES" in the screen illustrated in FIG. 11, this means that the user has confirmed or approved continuing in the automatic driving mode to which the driving mode has been switched. On the other hand, if the user selects "NO", this means that the user does not approve continuing in the automatic driving mode to which the driving mode has been switched. That is to say, in step S2133, vehicle 100a confirms whether or not there has been input of user approval, and if there is input indicating user approval (Yes in S2133), the flow advances to S214. On the other hand, if there is no input indicating user approval (No in S2133), the second verification processing ends.

Figure 12:
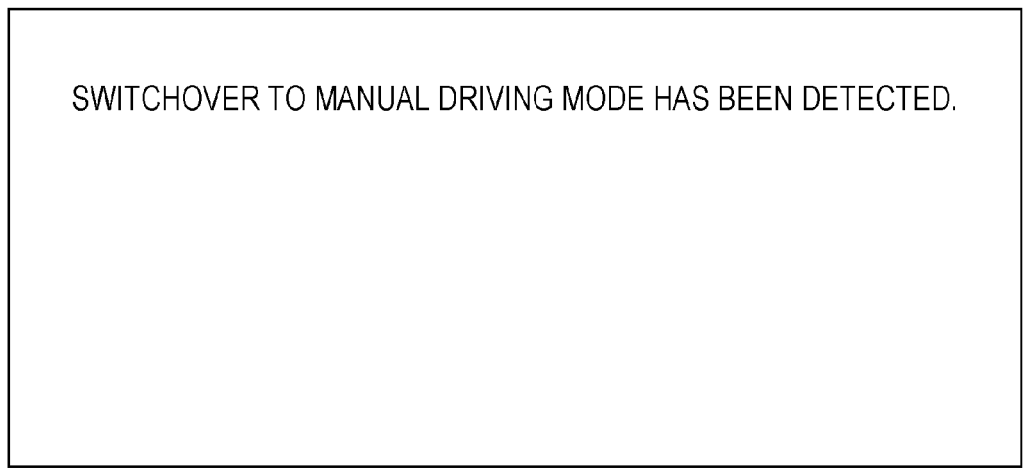
FIG. 12 is a diagram illustrating an example of a screen display displayed in the vehicle in the embodiment.

Note that in a case where the screen obtained from the authentication server 200a is the manual driving mode switching screen in step S2131 (manual driving mode switching screen in S2131), the vehicle 100a displays the manual driving mode switching screen (S2134), and the second verification processing ends. The manual driving mode switching screen is a screen such as illustrated in FIG. 12, for example, in the present embodiment. FIG. 12 is a diagram illustrating an example of a display screen displayed at the vehicle 100*a* in the present embodiment. FIG. 12 illustrates an example of a display screen stating, "SWITCHOVER TO MANUAL DRIVING MODE HAS BEEN DETECTED". That is to say, FIG. 12 illustrates an example of a display screen for the vehicle 100*a* to notify the user that the driving mode has switched to the manual driving mode. When the screen illustrated in FIG. 12 is displayed, the user is performing manual driving, so there is nothing displayed in the screen illustrated in FIG. 12 for the user to select from.

Second transaction data including confirmation information indicating user confirmation or approval is then generated in step S214, and transmitted to the authentication server 200*a*. The confirmation information indicating user confirmation or approval may be information indicating the "YES" displayed in FIG. 11, for example, or may be information indicating approval (confirmation) of continuing in the automatic driving mode to which the driving mode has been switched.

Next, in step S215, the authentication server 200*a* performs verification of the obtained second transaction data, and if successful, records the second transaction data in the recording unit 216, and the flow advances to step S217.

Detailed processing of step S215 will be described now with reference to FIG. 10D. The authentication server 200*a* first performs verification of the obtained second transaction data, and confirms whether or not the verification was successful (S2151). In further detail, the authentication server 200*a* verifies whether the signature included in the second transaction data is valid. In a case where validity of the signature has been confirmed, and thus verification of the second transaction data has been successful in step S2151 (Yes in S2151), the authentication server 200*a* records the second transaction data in the recording unit 216 (S2152), and the flow advances to step S217. Note that in a case where verification of the second transaction data in step S2151 is unsuccessful (No in S2151), the authentication server 200*a* notifies the gateway 101 of the vehicle 100*a* to that effect (S2153), and ends the second verification processing.

Next, the authentication server 200*a* transmits duplicates of the obtained second transaction data to the other authentication servers 200*b* and 200*c* in step S217. Note that the other authentication servers 200*b* and 200*c* also verify the second transaction data transferred thereto and obtained. This verification processing is the same as the processing described with reference to FIG. 10D.

In step S218, the authentication server 200*a*, authentication server 200*b*, and authentication server 200*c* execute a consensus algorithm. Execution of the consensus algorithm verifies that the second transaction data obtained by the authentication server 200*a*, authentication server 200*b*, and authentication server 200*c* is valid. The authentication servers 200*a*, 200*b*, and 200*c* generate a block including the verified second transaction data.

1.3 Advantages of Embodiment

Thus, according to the driving management system 10 and so forth of the present embodiment, the history of all driving mode switches in the vehicle can be recorded in a storage device, so driving mode switching in the vehicle can be managed in a sure manner. Also, according to the driving management system 10 and so forth of the present embodiment, in a case where the driving mode switches from the manual driving mode to the automatic driving mode, whether the user has approved or confirmed continuing in the automatic driving mode to which the driving mode has been switched is also recorded as history. Thus, the driving management system according to the present embodiment can manage driving mode switching in a vehicle in a sure manner.

Accordingly, in a case where a problem occurs, such a malfunction of the vehicle or an accident, whether the driving mode of the vehicle was the automatic driving mode or the manual driving mode at the point that the problem occurred can be objectively judged. Accordingly, verification of whether there was an abnormality or the like in the automatic driving functions realizing the automatic driving system can be performed in a sure manner, so if there is a problem with the automatic driving functions, the automatic driving functions can be improved. Thus, traffic accidents while in the automatic driving mode can be suppressed, so a safer automatic driving system can be constructed.

Further, according to the driving management system 10 of the present embodiment, whether a traffic accident or malfunction has occurred during the automatic driving mode can be objectively judged, and if that is the case, it can be shown that the driver cannot be held responsible. As a result, compensation or the like for the traffic accident or malfunction can be sought from the automaker or insurance company.

Blockchain technology, where tampering is difficult, is used to manage the history of all driving mode switches in the vehicle in the driving management system 10 and so forth according to the present embodiment, so the history of all driving mode switches in the vehicle can be confirmed in a sure manner at a later time, without concern of tampering. Accordingly, verification of whether there was an abnormality or the like in the automatic driving functions realizing the automatic driving system can be performed in a sure manner, so if there is a problem with the automatic driving functions, the automatic driving functions can be improved. Thus, traffic accidents while in the automatic driving mode can be suppressed, so a safer automatic driving system can be constructed.

Modification

Although description has been made in the above embodiment regarding the driving management system 10 where switching of the assistance function of the driving assistance unit 120, including switching of the driving mode of the vehicle, is managed by blockchain technology that is difficult to tamper with, this is not restrictive. Switching of the assistance function of the driving assistance unit 120 including switching of the driving mode may be managed without using blockchain technology. This point will be described as a modification, description being made primarily regarding points that differ from the above embodiment.

1.4 System Configuration

The management system 10 according to the present modification records switching of the assistance function of the driving assistance unit 120, including switching of the driving mode as history, in the same way as in the above embodiment. The management system 10 according to the present modification also records user confirmation of continuing in the automatic driving mode, if switching from the manual driving mode to the automatic driving mode, in the same way as in the above embodiment.

Figure 13:
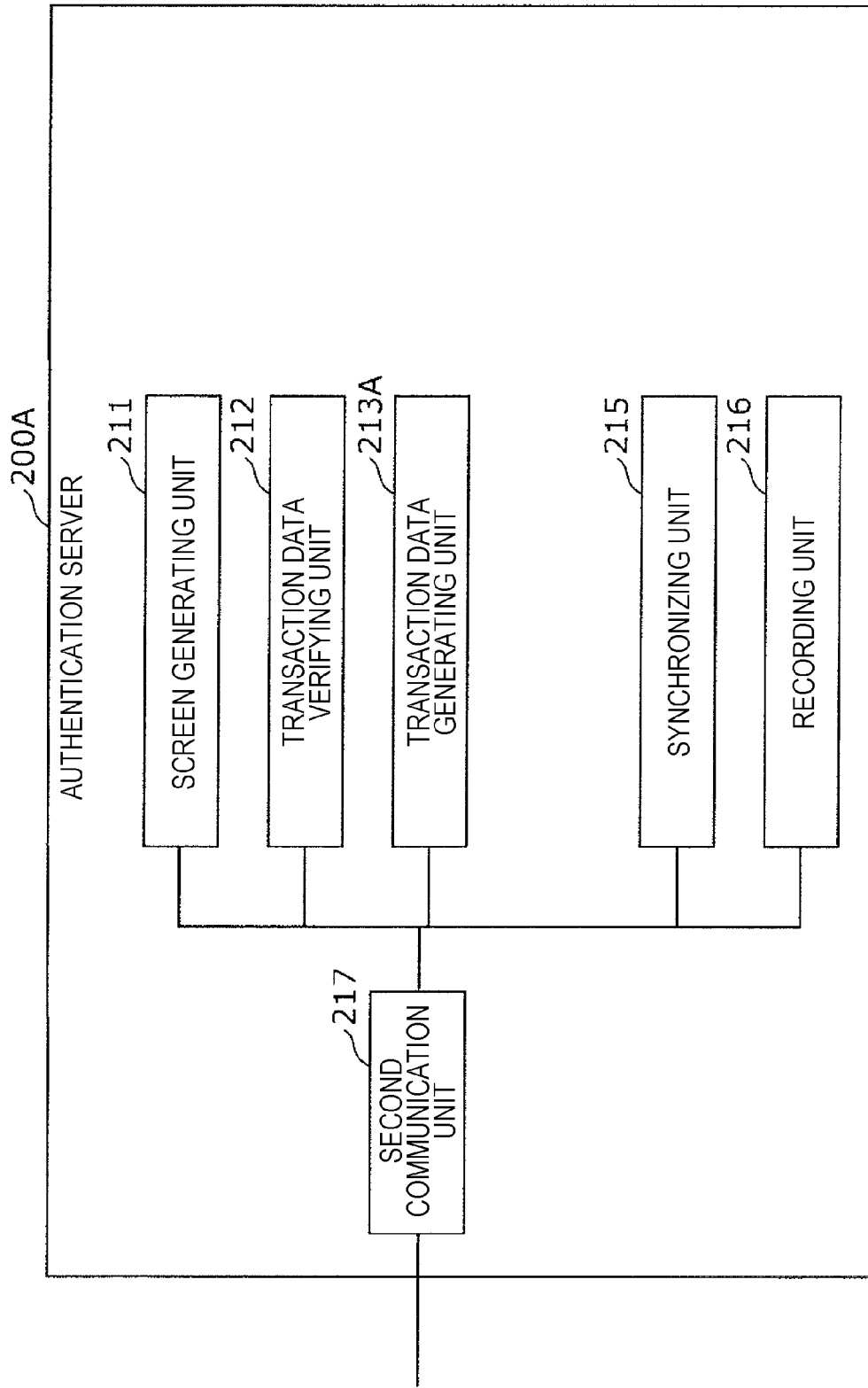
FIG. 13 is a block diagram illustrating the functional configuration of an authentication server according to a modification of the embodiment.

The driving management system 10 according to the present modification has one or more vehicles 100*a*, 100*b*, and 100*c* illustrated in FIG. 1 for example, one or more authentication servers such as the authentication server 200A illustrated in FIG. 13 or the like, and the automaker server 300. Note that the vehicles 100*a* and so on differ from the above embodiment only with respect to the point that first transaction data and second transaction data is generated as non-blockchain transaction data, and otherwise are the same. The automaker server 300 also differs from the above embodiment only with respect to the point that third transaction data is generated as non-blockchain transaction data, and otherwise is the same. The authentication server 200A will be described later.

1.4.1 Configuration of Authentication Server 200A

FIG. 13 is a block diagram illustrating the functional configuration of the authentication server 200A according to the modification of the embodiment. Components that are the same as in FIG. 5 are denoted by the same reference numerals, and detailed description thereof will be omitted.

The authentication server 200A illustrated in FIG. 13 differs from the authentication server 200a according to the embodiment with regard to the point that the configuration of a transaction data generating unit 213A differs, and that the block generating unit 214 has been omitted. The transaction data generating unit 213A may generate second transaction data that is not blockchain transaction data, in a case of having conformation information from the vehicles 100a and so on. Otherwise, the configuration is the same as in the embodiment, so description will be omitted.

1.5 Operations, Etc.

The processing operations of the driving management system 10 according to the present modification configured as described above will be described next.

1.5.1 Registration Processing Between Automaker Server 300 and Authentication Server 200A

First, registration processing of registering the second identifier, that uniquely identifies legitimate vehicles capable of switching between manual driving and automatic driving, at the authentication server 200A, will be described. Description will be made here regarding a case of the automaker server 300 transmitting third transaction data including the second identifier to the authentication server 200A.

FIG. 14 is a sequence diagram illustrating registration processing between the automaker server 300 and authentication server 200A according to the modification of the embodiment. Elements that are the same as in FIG. 8A and so forth are denoted by the same reference symbols, and detailed description will be omitted. FIG. 15 is an example of a data structure used at the time of the authentication server 200A according to the modification of the embodiment recording the third transaction data.

First, in step S101, the automaker server 300 obtains the second identifier indicating a legitimate vehicle capable of switching between manual driving and automatic driving.

Next, in step S102, the automaker server 300 generates third transaction data including the second identifier of the legitimate vehicle that has been obtained. The third transaction data here is transaction data that is not recorded as a blockchain.

The automaker server 300 then transmits the generated third transaction data to the authentication server 200A in step S103.

Then in step S104A, the authentication server 200A verifies the third transaction data that has been obtained, and if successful, the flow advances to step S104B. Detailed processing of step S104A is the same as that described in FIG. 8B, so description will be omitted here.

Next, in step S104B, the authentication server 200A records the third transaction data in the recording unit 216. More specifically, the authentication server 200A records in a storage device 201A that the type of the vehicle indicated by the second identifier obtained in registration processing which is a transaction of registration, is a legitimate vehicle capable of switching between manual driving and automatic driving, as illustrated in FIG. 15 for example. Thus, the authentication server 200A records the third transaction data that is not blockchain transaction data in the storage device 201A.

1.5.2 Verification Processing Between Vehicle 100a and Authentication Server 200A

Next, processing in a case where driving mode switching of the vehicle 100a has been detected, and this switching is verified between the vehicle 100a and authentication server 200A will be described. A case will be described here regarding a case of transmitting first transaction data including information indicating this switching and the first identifier of the vehicle 100a, from the vehicle 100a to the authentication server 200A.

Figure 16:
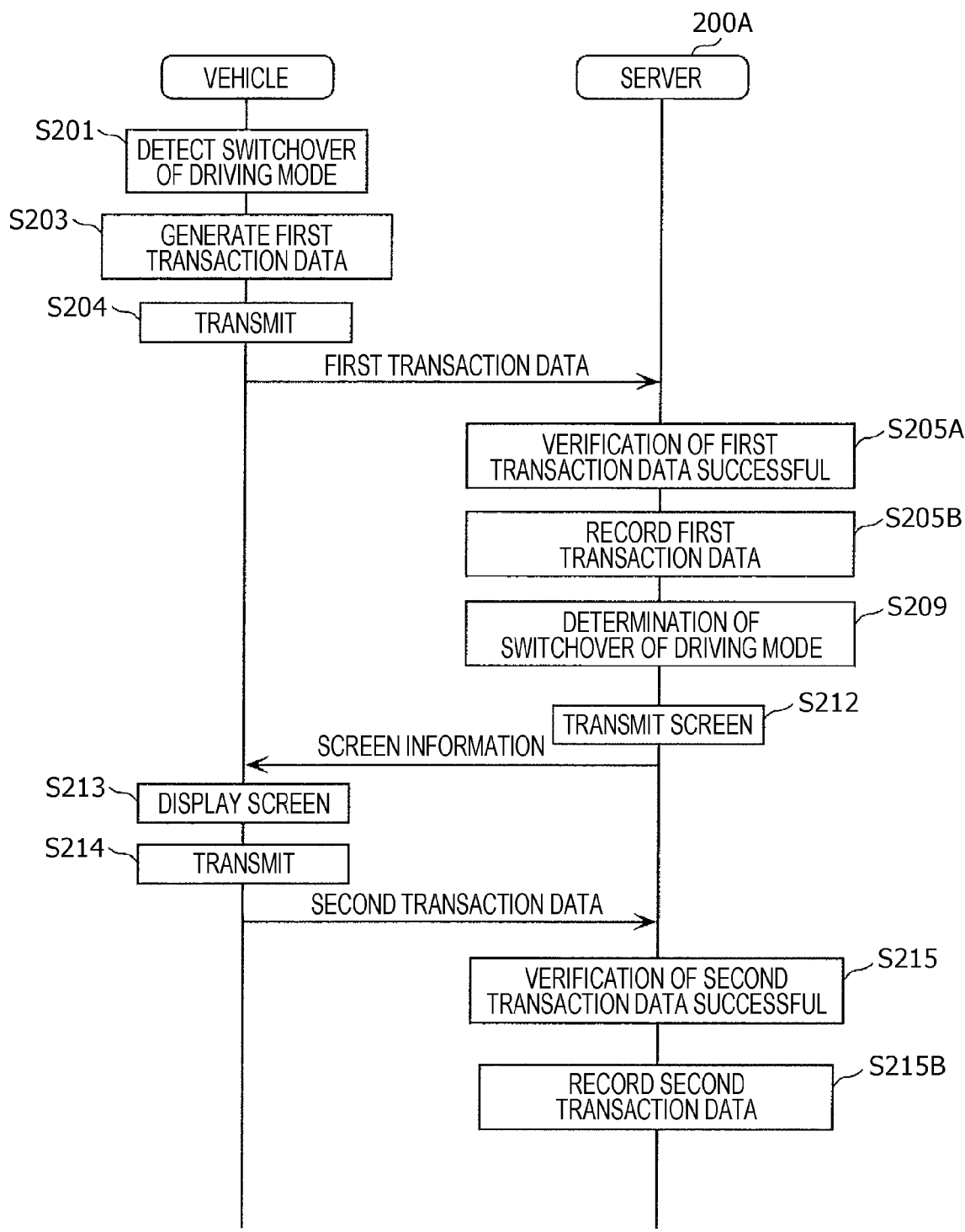
FIG. 16 is a sequence diagram illustrating first verification processing between the vehicle and authentication server in the modification of the embodiment.

FIG. 16 is a sequence diagram illustrating first verification processing between the vehicle 100a and authentication server 200A according to the modification of the present embodiment. Elements that are the same as in FIG. 9A and so forth are denoted by the same reference symbols, and detailed description will be omitted. FIG. 17 is an example of a data structure used at the time of the authentication server 200A according to the modification of the present embodiment recording the first transaction data. The first verification processing will be described as processing from detection of driving mode switching at the vehicle 100a up to verification of the first transaction data including information indicating this switching, here as well.

First, in step S201, the gateway 101 of the vehicle 100a detects that driving mode switching has been performed at the vehicle 100a. Detailed processing of step S201 is the same as that described in FIG. 9B, and accordingly description will be omitted here.

The gateway 101 of the vehicle 100a then in step S203 generates the first transaction data including switching information indicating the driving mode switching, and the first identifier indicating the vehicle 100a. In the present modification as well, the first transaction data is generated including the switching information and the first identifier, and authentication information such as a signature for information including the switching information and the first identifier, for example.

Next, in step S204, the gateway 101 of the vehicle 100a transmits the generated first transaction data to the authentication server 200A.

The authentication server 200A then performs verification of the obtained first transaction data in step S205A, and if successful, the flow advances to step S205B. The detailed processing of step S205B is the same as that described in FIG. 9C, so description will be omitted here.

Next, the authentication server 200A records the first transaction data in the recording unit 216 in step S205B. More specifically, the authentication server 200A records in the storage device 201A whether the driving mode has switched to the manual driving mode or switched to the automatic driving mode in the transaction indicating driving mode switching at the vehicle indicated by the first identifier that has been obtained, as illustrated in FIG. 17 for example. Also, in a transaction indicating switching of the driving mode, the authentication server 200A further records whether or not there has been user approval in a case of having switched to the automatic driving mode, as illustrated in FIG. 17, for example. Thus, the authentication server 200A records the first transaction data in the storage device 201A.

In the same way, the authentication server 200A also records the third transaction data in the recording device 201A using a data structure that does not use a blockchain, in the second verification processing following the first verification processing as well.

2. Other Modifications

Although the present disclosure has been described by way of the above embodiment and modification, it is needless to say that the present disclosure is not restricted to these. The following cases are also included in the present disclosure.

(1) Although the authentication server and automaker server have been described as being different devices in the above embodiment, the authentication server and automaker server may be configured as the same device.

(2) Although the authentication server is described as notifying the vehicle in a case of having detected an error in switching of driving modes in the above embodiment and modification, the automaker server may be notified as well.

(3) The blockchain managed by the authentication server in the above embodiment may be able to be referenced by the automaker server. Further, this blockchain may be able to be referenced not only by the automaker server but also by a server of an insurance company (omitted from illustration).

(4) Although an arrangement is described in the above embodiment and modification where the gateway 101 of the vehicle 100a detects switching of the driving mode, and transmits the first transaction data including switching information indicating this switching and the first identifier indicating the vehicle 100a and so on, this is not restrictive. The gateway 101 may generate the first transaction data including an identifier indicating a function operating at the driving assistance unit 120 and/or the ECU 121 of the driving assistance unit 120. Accordingly, which function of the driving assistance unit 120 was operating in the automatic driving mode when the problem occurred with the vehicle 100a and so on, i.e., the automatic driving exhibited an abnormality, and so forth, can be easily verified. Also, the function operating at the driving assistance unit 120 when the problem occurred with the vehicle 100a and so on, i.e., the automatic driving exhibited an abnormality, can be easily identified by the identifier of the ECU 121 of the driving assistance unit 120.

(5) Although an arrangement is described in the above embodiment and modification where the gateway 101 of the vehicle 100a and so on detects switching of the driving mode, this is not restrictive. An arrangement may be made where any or all ECUs in the onboard network of the vehicles 100a and so on have the same functions, and any ECU can detect switching of the driving mode.

(6) Although description has been made in the above embodiment and modification that when switching from the manual driving mode to the automatic driving mode has been detected, a screen display is made to the user such as the driver, on the head unit 140 of the vehicle 100a and so on, prompting input of information by the user, this is not restrictive. An arrangement may be made where, when switching from the manual driving mode to the automatic driving mode is detected, notification is made to the user thereof and confirmation is made regarding continuation of the automatic driving mode by audio, and the user is prompted to input information by speech.

(7) Although the automaker server is described as obtaining the first identifier indicating the vehicle in the above embodiment and modification, this is not restrictive. The automaker server may also obtain driving assistance functions or automatic driving functions implemented in the vehicle, in addition to this first identifier. Accordingly, the authentication server can verify whether the driving assistance functions and automatic driving functions included in the second transaction data that has been received agree with the driving assistance functions and automatic driving functions obtained from the automaker server.

(8) Although description has been made in the above embodiment and modification that the gateway 101 of the vehicle 100a and so on detects switching of the driving mode and transmits to the authentication server, a message transmitted on the onboard network of the vehicle 100a and so on may also be transmitted besides information indicating the switching of the driving mode. Accordingly, switching of the driving mode can be detected by referencing transaction data including the first transaction data recorded in the authentication server, and confirming the message on the onboard network. This also allows for confirmation regarding which timing while in the manual driving mode the driving mode was switched to the automatic driving mode.

(9) Although an arrangement is made in the above embodiment and modification that the gateway 101 of the vehicle 100a and so on detects switching of the driving mode, and transmits first transaction data including switching information indicating this switching and the first identifier to the authentication server, this is not restrictive. The gateway 101 may further include an automatic driving level executed by the automatic driving function implemented in the vehicle 100a or in the automatic driving mode, and transmit.

More specifically, in a case where the information indicating switching that the detection unit 1101 has detected indicates switching from the manual driving mode to the automatic driving mode, the transaction data generating unit 1102 may generate first transaction data including information indicating the automatic driving level in the automatic driving mode, in addition to the information indicating switching that the detection unit 1101 has detected and the first identifier indicating the vehicle, and transmit to one authentication server via the first communication unit 1103. In this case, when creating and displaying a screen for confirmation with the user (driver) regarding whether or not to continue the automatic driving mode in steps S212 and S213 in FIG. 10A and so forth, confirmation may further be made regarding the automatic driving level. The automatic driving levels are 0 through 5. Level 0 indicates that the driver performs all operations, and level 1 indicates that the automatic driving system performs driving support of supporting one or the other of steering operations and acceleration/deceleration. Level 2 indicates that the automatic driving system performs driving support of supporting both steering operations and acceleration/deceleration. Level 3 indicates automatic driving where the automatic driving system performs all operations at particular locations, while the driver performs operations in an emergency. Level 4 indicates automatic driving where the automatic driving system performs all operations at particular locations. Level 5 indicates complete automatic driving, where the automatic driving system performs all operations, regardless of location.

In a case where the information indicating switching that the detection unit 1101 has detected indicates switching from the manual driving mode to the automatic driving mode, the transaction data generating unit 1102 may generate first transaction data including information indicating the driving assistance function that will operate in the automatic driving mode, in addition to the information indicating switching that the detection unit 1101 has detected and the first identifier indicating the vehicle, and transmit to the authentication server via the first communication unit 1103.

(10) Although an arrangement is made in the above embodiment and modification that the gateway 101 of the vehicle 100a and so on detects switching of the driving mode, and transmits first transaction data including switching information indicating this switching and the first identifier to the authentication server, this is not restrictive. The gateway 101 may further include sensor information obtained from sensors installed in the vehicle 100a, and transmit. Sensor information here is information relating to the driver of the vehicle 100a, including the state of the driver.

More specifically, each of the one or more vehicles may have a sensor unit or a sensor that obtains sensor information indicating information relating to the driver of the vehicle, for each predetermined period or each event, the sensor unit transmitting obtained sensor information to the transaction data generating unit 1102, the transaction data generating unit 1102 generating first transaction data including information indicating switching, the first identifier and sensor information, and transmit to the one authentication server via the first communication unit 1103.

For example, the sensor unit may include a camera installed within the vehicle 100a and so on. In this case, the sensor information may include images, moving images, or iris information of the driver taken by the camera. The sensor unit may be a millimeter-wave radar installed within the vehicle 100a and so on, for example. In this case, the sensor information may include information indicating the pulse of the driver obtained by millimeter-wave.

(11) Devices in the above-described embodiments and modifications specifically are computer systems made up of microprocessors, read-only memory (ROM), random access memory (RAM), hard disk units, display units, keyboards, mice, and so forth. Computer programs are recorded in the RAM or hard disk units. The devices achieve their functions by the microprocessors operating following the computer programs. Note that a computer program is configured by combining multiple sets of command codes instructing commands with respect to a computer, to achieve predetermined functions.

(12) Part or all of the components configuring the devices in the above-described embodiments and modifications may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip.

While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

(13) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(14) The present disclosure may be the methods described above, or may be a computer program which realizes these methods by a computer, or may be digital signals made up of the computer program. The present disclosure may also be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums.

The present disclosure may also be an arrangement where the computer program or the digital signals are transmitted over an electric communication line, wireless or cable communication line, a network of which the Internet is representative, data broadcasting, or the like.

The present disclosure may also be a computer system having a microprocessor and memory, where the memory records the computer program, and the microprocessor operates according to the computer program.

The program or the digital signals may be recorded in the recording medium and transported, or the program or the digital signals may be transported over the network or the like, and thereby be executed by another computer system that is independent.

(15) The above embodiments and modifications may each be combined.

The present disclosure is applicable to a driving management system, a vehicle, and an information processing method of the driving management system, and particularly can be used in a driving management system, a vehicle, and an information processing method of the driving management system where switching of driving modes in a vehicle such as an automobile is managed in a sure manner.

What is claimed is:
1. A vehicle comprising:
   a plurality of wheels to allow physical movement of the vehicle;

a plurality of electronic control processors;
a processor;
a memory which includes instructions that, when executed by the processor, causes the processor to perform operations including:
detecting switching between a manual driving mode where manual driving is performed, and an automatic driving mode where automatic driving is performed, based on a message issued by at least one of the plurality of electronic control processors;
generating first transaction data including information indicating the detected switching, and a first identifier indicating the vehicle; and
transmitting the first transaction data.

2. The vehicle according to claim 1,
wherein the first transaction data is used to determine whether the vehicle is in the manual driving mode or the automatic driving mode when a malfunction or an accident occurs.

3. The vehicle according to claim 1, further comprising:
an user interface for accepting input information,
wherein the user interface transmits the input information, which is information indicating approval of continuing in the automatic driving mode to which the driving mode has switched, to the vehicle, and
wherein the processor further performs:
  generating second transaction data including the input information, and
  transmitting the second transaction data.

4. The vehicle according to claim 1,
wherein, when switching information indicates switching from the manual driving mode to the automatic driving mode, the generating includes generating the first transaction data that includes, in addition to the switching information and the first identifier indicating the vehicle, information indicating an automatic driving level in the automatic driving mode.

5. The vehicle according to claim 1,
wherein, when switching information indicates switching from the manual driving mode to the automatic driving mode, the generating includes generating the first transaction data that includes, in addition to the switching information and the first identifier indicating the vehicle, information indicating a driving assistance function that operates in the automatic driving mode.

6. The vehicle according to claim 1, further comprising:
a sensor that obtains sensor information indicating information relating to a driver of the vehicle,
wherein the sensor transmits the sensor information to the vehicle, and
wherein the first transaction data includes the information indicating switching, the first identifier, and the sensor information, and transmit.

7. The vehicle according to claim 1,
further comprising generating transaction data including the first transaction data as blockchain transaction data.

8. The vehicle according to claim 1,
wherein the vehicle is capable of autonomously switching between the manual driving mode and the automatic driving mode,
in the detecting, autonomous switching between the manual driving mode and the automatic driving mode is detected, and
the first transaction data further includes information indicating the detected autonomous switching.

9. A driving management system, comprising:
one or more servers; and
a vehicle,
wherein the vehicle includes:
  a plurality of wheels to allow physical movement of the vehicle;
  a plurality of electronic control processors;
  a processor;
  a memory which includes instructions that, when executed by the processor, causes the processor to perform operations including:
    detecting switching between a manual driving mode where manual driving is performed, and an automatic driving mode where automatic driving is performed, based on a message issued by at least one of the plurality of electronic control processors;
    generating first transaction data including information indicating the detected switching, and a first identifier indicating the vehicle; and
    transmitting the first transaction data to at least one server of the one or more servers.

* * * * *